US012614539B1

(12) United States Patent
Myers

(10) Patent No.: US 12,614,539 B1
(45) Date of Patent: Apr. 28, 2026

(54) PERSONALIZED INNER VOICE SYNTHESIS USING ADAPTIVE ACOUSTIC PARAMETER MODIFICATION USING DEMOGRAPHIC DATA

(71) Applicant: RANDOLPH VENTURES LLC, Clearwater, FL (US)

(72) Inventor: James Randolph Myers, Clearwater, FL (US)

(73) Assignee: Randolph Ventures LLC, Clearwater, FL (US)

( * ) Notice: Subject to any disclaimer, the term of this patent is extended or adjusted under 35 U.S.C. 154(b) by 0 days.

(21) Appl. No.: 19/412,420

(22) Filed: Dec. 8, 2025

(51) Int. Cl.
*G10L 13/02* (2013.01)
*G10L 21/0208* (2013.01)
*G10L 21/0232* (2013.01)
*G10L 25/30* (2013.01)
*H04R 3/04* (2006.01)

(52) U.S. Cl.
CPC ................ *G10L 13/02* (2013.01); *H04R 3/04* (2013.01); *G10L 21/0208* (2013.01); *G10L 21/0232* (2013.01); *G10L 25/30* (2013.01)

(58) Field of Classification Search
USPC .......................................................... 704/260
See application file for complete search history.

(56) References Cited

U.S. PATENT DOCUMENTS

2022/0109930 A1 * 4/2022 Kim ....................... H04R 3/005

FOREIGN PATENT DOCUMENTS

CN 120585332 * 8/2025 ............... H04L 9/00

* cited by examiner

*Primary Examiner* — Farzad Kazeminezhad
(74) *Attorney, Agent, or Firm* — Perkins Coie LLP; Sumedha Ahuja; Willa Wu

(57) ABSTRACT

The systems and methods disclosed herein generate a personalized inner voice audio output that replicates or otherwise shares the acoustic characteristics of a speaker's self-perceived voice, which can differ from their externally perceived voice due to bone conduction effects. The systems and methods disclosed herein can generate a provisional voice clone (e.g., parameters of a voice model) of the speaker's voice (e.g., using a recording of the speaker's voice), and can apply a frequency shift to compensate for the absence of bone-conducted low-frequency adjustment that occurs during natural speech production. A trained artificial intelligence model predicts and applies one or more additional acoustic parameter adjustment values (e.g., formant structure, spectral envelope, prosodic patterns) to the provisional voice clone based on one or more factors (e.g., demographic, anatomical, content, environment). The provisional voice clone can be iteratively refined based on received user feedback (e.g., until the output aligns with the speaker's perception of their inner voice).

20 Claims, 6 Drawing Sheets

PERSONALIZED INNER VOICE SYNTHESIS USING ADAPTIVE ACOUSTIC PARAMETER MODIFICATION USING DEMOGRAPHIC DATA

BACKGROUND

Speech is an acoustic signal produced by the human vocal apparatus. The acoustic properties of speech are characterized by multiple time-varying parameters such as fundamental frequency (F0), which represents the rate of vocal fold vibration and determines perceived pitch, formant frequencies (F1, F2, F3, F4, etc., which are resonant peaks in the frequency spectrum determined by vocal tract shape and length), spectral envelope characteristics describing energy distribution across frequency bands, prosodic features (e.g., intonation contours, stress patterns, rhythm), voice quality parameters (e.g., jitter, shimmer, harmonic-to-noise ratio), and so forth. Speech signals can be represented in time domain as waveforms or transformed into frequency domain representations (e.g., spectrograms, mel-frequency cepstral coefficients (MFCCs), linear predictive coding (LPC)) for downstream analysis.

A speech model is a computational representation that captures the acoustic properties of speech and enables the generation of artificial speech from input parameters such as text, phonetic sequences, or acoustic features. Modern speech models use neural network architectures trained on a corpora of speech data to learn mappings between linguistic content and acoustic realizations. Speech models can be speaker-independent (trained to generate speech in a generic voice) or speaker-dependent (trained or adapted to replicate the acoustic characteristics of specific individuals). However, the speech (e.g., advice, recommendations) generated by the speech models are often resisted by users when they cognitively perceive speech output (e.g., a speech signal) as originating from an external source.

Figure 1:
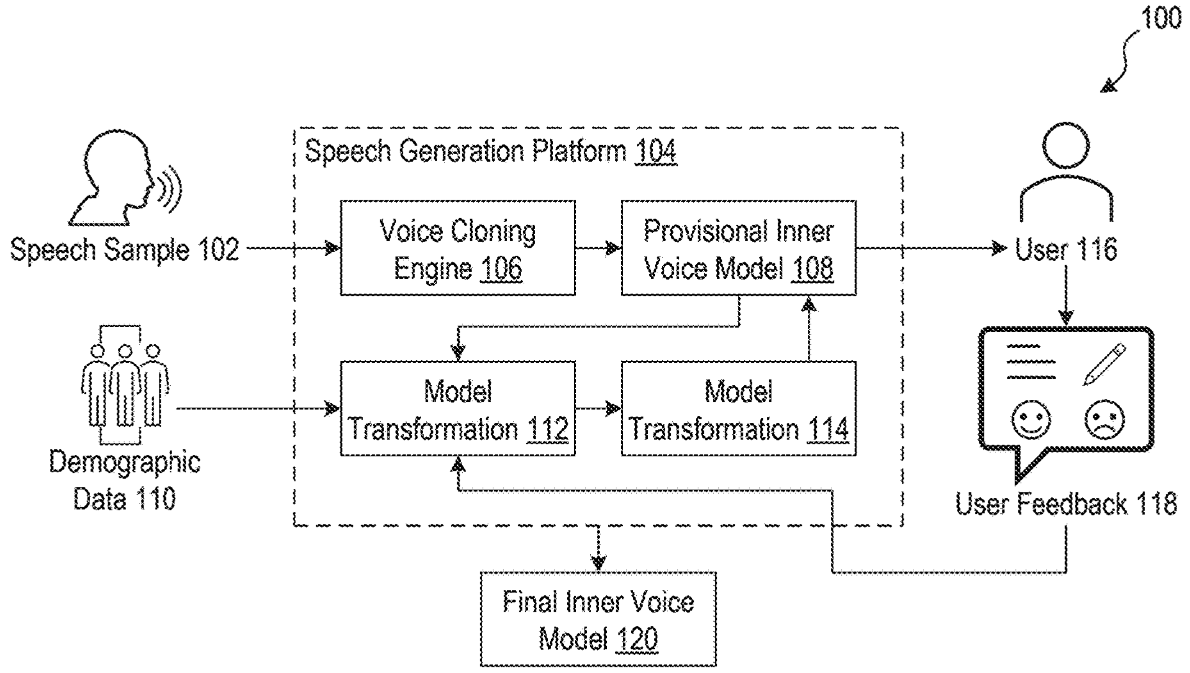
FIG. 1 shows a schematic illustrating an example environment of an architecture of a speech generation platform, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Throughout history, people have sought effective ways to use voices to influence and persuade others. One major approach focuses on how messages are delivered—for example, using celebrity voices, trusted family members, or close friends. Another approach focuses on the actual content of the message, such as logical arguments or emotional appeals. A trusted voice greatly increases the likelihood that a message will be well received and acted upon. Orators, promoters, and spokespersons with appealing voices and recognized authority have played significant roles in politics and advertising for decades. However, these traditional solutions present a voice that differs from how speakers hear themselves.

This system and method for creating a speaker's "inner voice," i.e., the voice perceived internally by the speaker, provides advantages across numerous applications. The inner voice can be leveraged for life coaching, self-improvement, mental therapy, hypnosis, peak performance in sports, theater, public speaking, and even accelerated healing in coma, accident, or post-surgical scenarios. Additionally, it can enhance the emotional impact of messages. The invention described here is not limited to these examples. Rather, its solutions are broadly applicable to various situations and challenges.

In conventional approaches, listeners perceive the message as external, i.e., originating from someone other than themselves. The human brain contains structures that evaluate whether a voice is trustworthy, requiring increased cognitive processing and causing delays in responding to external voices. Furthermore, the brain's assessment may result in a lack of trust in the voice.

Technologies such as voice recordings and artificial intelligence (AI) models for cloned voices are widely available. These methods are often used for fraud, entertainment, politics, and even self-talk. However, the recorded or cloned voice differs from the speaker's inner voice. The external voice heard by others is distinct from the voice heard internally by the speaker. Because of this difference, the brain scrutinizes and evaluates the external voice's trustworthiness, leading to additional cognitive effort and potential delays in response. In some cases, the brain may even judge the speaker's own external voice as untrustworthy.

To address these technical challenges, a novel solution has been developed that allows an individual's external voice to be modified to resemble their inner voice. This process involves several innovative techniques that can be applied in various sequences. The speaker's external voice is recorded. Using an AI model, the voice (as recorded or after modification by the speaker) is modified to create a version of the inner voice. The AI model incorporates factors such as bone conduction effects, estimated changes in frequency and tonal qualities, and/or demographic data to adjust the voice. The AI model, in some implementations, considers linguistic and cultural variables to refine the inner voice. Multiple inner voice variations can be generated for different contexts, languages, cultures, multilingual switching, moods, and/or stress levels.

The system enables the speaker to refine both the external and/or provisional inner voices by listening and making adjustments. This can be accomplished through a Graphical User Interface (GUI), voice commands, and/or A/B testing. The speaker can enter proposed adjustments before or after recording or modification of the voice by the AI model. Through iterative feedback, the voice is fine-tuned until the speaker perceives it is close to or indistinguishable from their perceived inner voice. Additionally, the system can implement filters, guardrails, or restrictions to prevent inappropriate content or physically harmful audio (such as excessively loud or damaging frequencies).

Once the inner voice is established, the characteristics of the inner voice can be stored either on a local device, a remote server/cloud, or a mixture of locations. When use of the inner voice is desired, the AI model can use the stored profile to deliver desired content. The stored inner voice can be used to communicate predetermined scripts or generate new material, such as reading books, responding as a chatbot, or singing. This capability encompasses a wide range of speaking roles. Furthermore, multiple inner voice profiles for a single speaker—tailored to different contexts or emotional states, such as interacting with children, family, or strangers—can be stored and deployed by the AI model.

Overview of the Speech Generation Platform

Speech-based outputs provide a channel for delivering information, instructions, and/or behavioral prompts to users via synthesized or recorded speech. Speech-based output can convey emotional tone and urgency (e.g., through prosodic features such as pitch variation, speaking rate, and/or amplitude modulation) that are difficult to communicate through text-based interfaces. Speech-based delivery systems that generate and deliver speech-based outputs are frequently deployed across various applications, such as virtual assistants that respond to user queries with spoken answers, navigation systems that provide audio instructions, accessibility tools that read screen content aloud, educational platforms that present instructional content, and so forth.

However, delivering recommendations or behavioral guidance to an individual through speech-based systems is often frustrated by lack of trust in and resistance to the source of the advice. Psychological research has long recognized that the acoustic characteristics of the voice delivering a message can significantly influence whether the content of the message will be accepted, trusted, and acted upon by the recipient. For example, voice quality, speaking style, and perceived speaker characteristics can affect message credibility and persuasiveness independent of the actual content being communicated. Listeners typically form judgments about speaker trustworthiness, competence, and likability based on vocal features such as pitch, speaking rate, accent, and voice quality within the first few seconds of hearing a voice. These initial impressions create cognitive biases that color the listener's interpretation and acceptance of the message content. Messages delivered in voices perceived as authoritative, warm, or similar to the listener's own demographic group tend to receive greater acceptance than messages delivered in voices perceived as untrustworthy, cold, or dissimilar.

In order to increase the chances that messages will be accepted by a user, conventional approaches to speech generation have attempted to select voices with universally pleasing acoustic characteristics such as clear articulation, moderate pitch, and neutral accent. In some conventional approaches, voice cloning technology has been used to replicate the voice of a trusted individual such as a celebrity, authority figure, or the external voice of the message recipient themselves. However, when users perceive a speech signal as originating from an external source such as a software application, automated system, or third-party entity, users typically engage in evaluation processes that assess the credibility, authority, and/or trustworthiness of that source before deciding whether to accept or reject the delivered recommendations. This source evaluation creates cognitive overhead that delays or prevents acceptance of the guidance.

In contrast, a speaker's perceived inner voice represents the auditory perception that an individual experiences when hearing their own voice during natural speech production or when internally vocalizing thoughts without producing external sound. The perceived inner voice differs substantially from the externally recorded voice that others hear because the perceived inner voice includes bone-conducted acoustic energy that travels through the skull and jaw directly to the inner ear, bypassing air conduction pathways. Bone conduction transmits low-frequency acoustic energy more efficiently than air conduction, thereby resulting in modified bass frequencies and spectral characteristics in the perceived inner voice as compared to the air-conducted external voice. This perceptual difference is typically why individuals often report that recordings of their own voice sound unfamiliar, higher pitched, or unpleasant compared to their internal auditory self-representation. The perceived inner voice typically forms the primary auditory identity that individuals associate with themselves through years of hearing their own voice during speech production, thereby creating a neural representation that the brain recognizes as self-generated rather than externally sourced.

Conventional approaches that use demographic matching to select voices based on the listener's age, gender, and/or cultural background remain insufficiently personalized because demographic categories encompass wide variation in individual voice characteristics. Two individuals of the same age and gender can have substantially different fundamental frequencies, formant structures, and/or speaking styles due to anatomical differences and learned speech patterns. Demographic matching selects voices that are statistically typical for a demographic group rather than acoustically similar to the specific individual listener, thereby leaving perceptual distance (e.g., gaps) between the delivery voice and the listener's own perceived inner voice that maintains the external source perception.

Further, conventional approaches that use artificial intelligence (AI) voice cloning to replicate the listener's own externally recorded voice are still recognized by the listener as external because the cloned voice lacks the bone-conducted low-frequency components that characterize the listener's self-perceived inner voice. When individuals hear recordings of their own externally recorded voice, users typically report that the voice sounds unfamiliar or unpleasant because the air-conducted acoustic signal captured by recording devices differs substantially from the bone-conducted signal they hear when speaking. The externally recorded voice clone replicates what others hear but not what the listener hears themselves, thereby creating a perceptual mismatch that prevents the cloned voice from being recognized as self-generated and thereby also maintaining psychological distance between the listener and the message source.

As such, the inventor has developed systems (hereinafter "speech generation platform") and related methods for generating a personalized inner voice audio output that replicates or otherwise shares the acoustic characteristics of a speaker's self-perceived voice, which can differ from their externally perceived voice due to bone conduction effects. The speech generation platform can generate a provisional voice clone (e.g., a model signal, a parameter set of a provisional inner voice model, and so forth) of the speaker's voice (e.g., using a recording of the speaker's voice), and can apply a frequency shift to compensate for the absence of bone-conducted low-frequency adjustment that occurs during natural speech production. A trained AI model predicts and applies one or more additional acoustic parameter adjustment values (e.g., deltas or changes in parameter values for parameters such as formant structure, spectral envelope, prosodic patterns) to the provisional voice clone based on demographic and/or anatomical factors. The provisional voice clone can be iteratively refined based on received user feedback (e.g., via a GUI or A/B testing) until the synthesized speech signal aligns with the speaker's perception of their inner voice as determined by the user indicating satisfaction, a convergence criterion based on diminishing acoustic parameter changes being satisfied, a threshold number of feedback iterations being completed, and so forth. The speech generation platform can synchronize the finalized inner voice model across multiple computing devices associated with the speaker to enable consistent personalized speech signals regardless of which device the user is currently using. The speech generation platform can upload the finalized acoustic parameter set (e.g., a finalized model signal) to a cloud storage service or synchronization server after the iterative refinement process completes. Each computing device associated with the speaker, including smartphones, laptop computers, desktop computers, tablet devices, smart speakers, vehicle infotainment systems, or wearable devices, downloads the synchronized acoustic parameters (e.g., model signals) from the cloud storage service and installs a local instance of the finalized inner voice model.

In some implementations, the speech generation platform operates using various computational architectures that distribute processing operations between local and/or remote computing resources. The speech generation platform can execute entirely on a local edge computing device such as a smartphone, tablet computer, or laptop computer using on-device processing resources including central processing units, graphics processing units, or neural processing units without transmitting audio data to external servers. The speech generation platform can alternatively operate using remote processing where a remote server executes the voice model and acoustic parameter value adjustment operations while the local computing device transmits the recorded speech sample and demographic data to the server and receives synthesized speech signal or finalized model parameters from the server. In some implementations, the speech generation platform operates using hybrid architectures where voice cloning operations that process the recorded speech sample execute locally on the edge device to maintain privacy of the user's voice data while model transformation operations that predict acoustic parameter adjustment values based on demographic data execute remotely on a server that maintains trained machine learning models and aggregated demographic transformation data from multiple users. In some implementations, the speech generation platform operates using federated learning architectures where multiple edge devices collaboratively train shared models by generating local model updates based on user feedback and transmitting only parameter adjustment values to a central aggregation server without transmitting raw audio data or individual acoustic parameters.

In some implementations, the speech generation platform adapts the personalized inner voice model to account for contextual factors that affect voice characteristics under different physiological or psychological conditions. The speech generation platform can obtain contextual state data indicating conditions of the speaker such as sleep deprivation level, stress level, intoxication level, emotional state, health status and so forth. The speech generation platform can store multiple variants of the inner voice model corresponding to different contextual states and automatically select a particular variant based on detected or inferred current conditions when generating speech signals for message delivery applications.

The speech generation platform generates audio output that mimics the acoustic characteristics of the user's self-perceived inner voice, thereby triggering the neural processing pathways associated with self-generated speech rather than external communication. Inner voice perception engages the default mode network (DMN), a set of brain regions including the medial prefrontal cortex, posterior cingulate cortex, and angular gyrus, which are active during self-referential thought, mind-wandering, and autobiographical memory retrieval, thereby creating associations between the delivered messages and the user's self-concept and personal identity. By generating a speech signal that aligns with the user's self-perceived inner voice, the speech generation platform reduces cognitive load used for message processing, decreases psychological reactance and resistance to behavioral recommendations, increases message credibility and trustworthiness through implicit self-attribution, and increases the likelihood that users will accept and act upon the delivered guidance.

In some implementations, the AI models described throughout the description herein operate as neurosymbolic AI systems that integrate neural network processing with symbolic reasoning. The neurosymbolic AI systems can maintain neural network components that perform statistical pattern recognition (e.g., using learned parameter weights) and symbolic reasoning components that execute rule-based inference (e.g., using logic operations), thus enabling the models to process multimodal input data while applying predefined logical constraints to produce outputs with audit trails that trace each inference step back to specific rules and/or data inputs.

A neurosymbolic AI system represents a computational architecture that combines neural networks with symbolic reasoning systems to perform both statistical pattern recognition and logical inference operations. The neural component includes, for example, interconnected nodes with learned parameter weights that evaluate input data to identify patterns and extract feature representations using one or more transformations. The symbolic component operates using one or more logic systems, knowledge graphs, and/or rule-based engines that execute logical operations using defined relationships and/or constraints. In some implementations, the neural network inference results operate as inputs to the symbolic reasoning system, and the symbolic reasoning system is enabled to execute one or more evaluations against the defined relationships and/or constraints to verify that generated neural network inference results comply with the defined relationships and/or constraints.

When implemented as neurosymbolic AI system(s), the AI models can maintain separate neural and symbolic components that evaluate user input data and generate validated outputs. The neural component, for example, evaluates user profile data, biometric measurements, and/or behavioral patterns using trained neural networks to identify one or more features and/or statistical relationships within the input data. The symbolic component can maintain structured knowledge base(s) with domain-specific rules, safety constraints, and/or other logical relationships that define valid operations and acceptable output parameters. During operation, the neural component can generate candidate acoustic parameter adjustment values that map the external voice to a perceived inner voice. The symbolic component can evaluate the candidate acoustic parameter adjustment values against the stored rules and constraints to verify that the predicted parameters satisfy one or more criterion. When the symbolic component detects violations of constraints (e.g., a fundamental frequency value outside physiologically valid ranges), the symbolic component can reject a candidate parameter and/or trigger the neural component to generate alternative predictions.

While the speech generation platform is described in detail with one or more sequences of operations, the order in which these operations are performed can be modified or rearranged. For example, the speech generation platform applies demographic-based acoustic parameter adjustment values before generating the provisional voice clone by pre-configuring the voice cloning model with predicted transformations based on the speaker's demographic data. In another example, the speech generation platform collects user feedback adjustments before applying demographic-based transformations by presenting an initial voice clone to the user for refinement and subsequently applying demographic predictions to fill in acoustic parameters that the user did not explicitly adjust. In some implementations, the speech generation platform can perform voice cloning, acoustic parameter transformation, and user feedback processing in parallel rather than sequentially. The specific ordering of operations described in the detailed description and illustrated in the figures represents example implementation sequences, but alternative orderings are additionally within the scope of the disclosed technology.

Further, while the speech generation platform is described in detail for generating personalized inner voice audio output, the speech generation platform can be applied, with appropriate modifications, to deliver content across diverse application domains. For example, the speech generation platform is deployed to deliver self-improvement messages where users explicitly request motivational affirmations, goal reminders, and/or behavioral coaching delivered in their personalized inner voice. In another example, the speech generation platform is deployed to present educational content such as instructional material, lesson narration, and/or learning feedback. In yet another example, the speech generation platform is deployed to provide therapeutic interventions where mental health support messages, cognitive behavioral therapy prompts, and/or wellness guidance is delivered. The examples provided in this paragraph are intended as illustrative and are not limiting. Any other application or workflow referenced in this document, and many others unmentioned, are equally appropriate after appropriate modifications.

While the current description provides examples related to neurosymbolic AI models, generative AI models, LLMs, and agents, one of skill in the art would understand that the disclosed techniques can apply to other forms of machine learning or algorithms, including unsupervised, semi-supervised, supervised, and reinforcement learning techniques. For example, the disclosed speech generation platform can generate personalized data signals using model outputs from symbolic AI models, support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean that the specific feature, structure, or characteristic following the phrase is included in at least one implementation of the present technology and can be included in more than one implementation. In addition, such phrases do not necessarily refer to the same implementations or different implementations.

Example Implementations of the Speech Generation Platform

FIG. 1 shows a schematic illustrating an example environment 100 of an architecture of a speech generation platform, in accordance with some implementations of the present technology. The environment 100 can be implemented using components of example computer system 700 illustrated and described in more detail with reference to FIG. 7. Likewise, implementations of example environment 100 can include different and/or additional components or can be connected in different ways.

The speech generation platform 104 is enabled to receive or otherwise obtain a speech sample 102 via a voice cloning engine 106. The voice cloning engine 106 can include an AI model such as a neural network trained to replicate acoustic characteristics of an input voice and generate synthetic speech from text input. The voice cloning engine 106 uses the speech sample 102 to generate/determine parameters (e.g., weights, biases) of a provisional inner voice model 108. The provisional inner voice model 108 is enabled to take as input a parameterized representation of the speaker's voice that indicates characteristics such as fundamental frequency, formant structure, spectral envelope characteristics, prosodic patterns, and so forth. The provisional inner voice model 108 can use the received input to generate an audio output (e.g., synthesized speech) in accordance with the generated/determined parameters of the provisional inner voice model 108.

The voice cloning engine 106 can generate/determine the parameters (e.g., acoustic parameters) associated with the provisional inner voice model 108 by selecting from a library of predefined provisional inner voice models and/or predefined parameter sets rather than training a new model from the speech sample 102. For example, the voice cloning engine 106 maintains a database of parameter sets corresponding to predefined provisional inner voice models that have been pre-trained on speech data from diverse speaker populations and indexed (e.g., according to acoustic characteristics, user demographic, and so forth). The voice cloning engine 106 can evaluate the speech sample 102 to extract acoustic feature vectors (e.g., representative of features such as frequency, pitch, volume) and compare the extracted acoustic feature vectors from the speech sample 102 against the indexed acoustic characteristics of the speech output (e.g., a speech signal) generated by the predefined provisional inner voice models (e.g., using distance metrics such as Euclidean distance, cosine similarity, and so forth) in the feature space. The voice cloning engine 106 can select a particular parameter set configured to, when used to form the provisional inner voice model, generates an output that exhibits the smallest distance or highest similarity to the acoustic features of the speech sample 102. In some implementations, the voice cloning engine 106 extracts or receives demographic data associated with the speaker of the speech sample 102 such as age, gender, language background, or geographic origin. The voice cloning engine 106 can rank the library of parameter sets corresponding to predefined provisional inner voice models based on demographic attributes matching or aligning within a certain threshold with the demographic data of the speaker.

In some implementations, the voice cloning engine 106 uses a transformer-based architecture that processes the speech sample 102 by applying a short-time Fourier transform (STFT) to convert the time-domain audio waveform into a frequency domain representation. The transformer-based architecture can generate or otherwise determine mel-spectrogram representations by mapping the frequency bins to a mel-frequency scale that approximates human auditory perception. The transformer encoder can process the mel-spectrogram frames through multiple self-attention layers to capture temporal dependencies and spectral patterns across the speech sample 102. The transformer encoder generates a speaker embedding vector by applying a pooling operation such as mean pooling or attention-weighted pooling across the temporal dimension of the encoded representations to produce a fixed-dimensional vector that encodes the acoustic properties of the speaker (e.g., statistical distributions of fundamental frequency values, formant frequency trajectories, spectral tilt characteristics, prosodic variation patterns). The voice cloning engine 106 can use the speaker embedding vector to condition a text-to-speech decoder network that generates the parameter set (e.g., acoustic parameters) corresponding to provisional inner voice model 108 by generating a mapping between the speaker embedding vector and model parameters that control acoustic feature generation (e.g., fundamental frequency contours, formant frequency values, spectral envelope shapes, prosodic timing patterns) to synthesize speech that replicates or otherwise aligns with the speaker's voice characteristics.

In some implementations, the voice cloning engine 106 uses a neural codec language model approach where the speech sample 102 is encoded into discrete acoustic tokens using a neural audio codec. The neural audio codec applies a convolutional encoder network to the speech sample 102 to generate a continuous latent representation that captures temporal and spectral features of the audio signal. The neural audio codec can discretize the continuous latent representation into a sequence of discrete acoustic tokens by selecting codebook entries from multiple quantization layers that minimize or otherwise reduce reconstruction error. The voice cloning engine 106 can extract a speaker embedding from the speech sample 102 by processing the discrete acoustic tokens through a speaker encoder network that aggregates token-level representations into a fixed-dimensional speaker identity vector. The language model component of the voice cloning engine 106 can include a transformer-based autoregressive model that predicts sequences of discrete acoustic tokens conditioned on both text input (e.g., encoded as phoneme sequences or subword tokens) and the speaker embedding extracted from the speech sample 102. The voice cloning engine 106 generates the parameter set corresponding to the provisional inner voice model 108 by training or adapting the language model component to associate the speaker embedding with the acoustic token sequences derived from the speech sample 102, thus enabling the provisional inner voice model 108 to synthesize new speech by predicting acoustic token sequences for text input while maintaining the speaker-specific acoustic characteristics encoded in the speaker embedding.

In some implementations, the voice cloning engine 106 uses a diffusion-based synthesis approach where a denoising diffusion probabilistic model iteratively refines random noise into speech spectrograms or waveforms by applying learned denoising steps conditioned on text representations and speaker identity information derived from the speech sample 102. The voice cloning engine 106 can extract speaker identity information from the speech sample 102 by processing the audio through a speaker encoder network that generates a speaker embedding vector capturing the acoustic characteristics of the speaker. The denoising diffusion probabilistic model can use a forward diffusion process that progressively adds Gaussian noise to training speech spectrograms over a sequence of timesteps until the spectrograms become indistinguishable from random noise. The model can learn or identify a reverse diffusion process by training a neural network to predict and remove the noise added at each timestep given the noisy spectrogram, the current timestep index, text representations encoded as phoneme embeddings or linguistic features, and the speaker embedding vector extracted from the speech sample 102. The voice cloning engine 106 generates the parameter set corresponding to the provisional inner voice model 108 by configuring the trained denoising diffusion probabilistic model to synthesize speech spectrograms through iterative denoising starting from random Gaussian noise and conditioning each denoising step on the speaker embedding derived from the speech sample 102 and text input to be synthesized. The provisional inner voice model 108 can be structured to apply a vocoder network to convert the synthesized speech spectrograms into time-domain audio waveforms that replicate or otherwise align with the acoustic characteristics of the speaker captured in the speech sample 102.

The voice cloning engine 106 can be trained on multi-speaker datasets including speech from different speakers to learn generalizable voice synthesis operations (e.g., parameters, workflows) before being adapted or conditioned on the specific speech sample 102 to replicate the target speaker's voice. During pre-training, the voice cloning engine 106 can determine a shared acoustic model that captures universal speech production parameters. After pre-training, the voice cloning engine 106 can adapt to the specific speech sample 102 by updating a subset of model parameters.

Using received or otherwise obtained demographic data 110 and the parameter set corresponding to the provisional inner voice model 108, the speech generation platform 104 can use a model transformation engine 112 to generate one or more model transformation(s) 114. The model transformation engine 112 can include a machine learning model trained to predict acoustic parameter adjustment values based on demographic characteristics such as age, gender, and anatomical features. For example, the model transformation engine 112 receives the demographic data 110 as input features that are encoded as numerical vectors or categorical embeddings representing attributes such as age in years, gender classification, ethnicity, language proficiency levels, and/or anatomical measurements such as estimated vocal tract length or skull structure characteristics. The model transformation engine 112 evaluates these input features through a neural network architecture (e.g., multi-layer perceptron, recurrent neural network, transformer encoder) that has been trained on a dataset of paired examples linking demographic profiles to acoustic transformation parameters. The training dataset can include records from multiple users where each record associates demographic attributes with quantified differences between externally perceived voice characteristics and self-perceived inner voice characteristics. The model transformation engine 112 can apply the trained neural network to the demographic data 110 to generate the model transformation(s) 114 as a set of predicted acoustic parameter adjustment values (e.g., a frequency offset value) that are predicted to align the parameter set corresponding to the provisional inner voice model 108 with a parameter set (e.g., one representative of the same or similar features as the parameter set corresponding to the provisional inner voice model 108) of the speaker's self-perceived inner voice based on demographic similarity to users in the training dataset.

In some implementations, the speech generation platform 104 uses visual data to infer anatomical characteristics of the user (such as bone structure), and uses the inferred anatomical characteristics to predict changes (e.g., acoustic parameter adjustments) from an externally-perceived voice to an internally-perceived voice. For example, the visual data can include facial photographs such as selfies captured through a front-facing camera of a smartphone or tablet device. The visual data can include profile photographs that show the speaker's face from side angles to capture a jaw structure and skull profile of the user. In some implementations, the visual data includes three-dimensional facial scans. The speech generation platform 104 can apply a computer vision model to the visual data to identify one or more anatomical measurements. For example, the computer vision model can determine facial bone structure characteristics such as jaw width measured as the distance between the left and right mandibular angles, a facial height measured from the chin to the forehead, and so forth. The computer vision model can determine soft tissue characteristics (e.g., facial fat distribution) that can affect acoustic damping. In some implementations, the computer vision model implements convolutional neural networks trained on datasets of facial images annotated with corresponding anatomical measurements. The model transformation engine 112 receives the inferred anatomical characteristics as input features (e.g., along with the demographic data 110) and uses these anatomical features to identify acoustic parameter adjustments that account for the speaker's specific anatomical structures.

The model transformation(s) 114 can be applied to the parameter set corresponding to the provisional inner voice model 108 to generate a modified speech signal such as a speech output that is presented to a user 116. The speech generation platform 104 applies the model transformation(s) 114 to the parameter set corresponding to the provisional inner voice model 108 by modifying the acoustic parameter set within the parameter set corresponding to the provisional inner voice model 108. The provisional inner voice model 108 can synthesize the modified speech output by generating audio using the adjusted acoustic parameter set. The speech generation platform 104 can present the modified speech output to the user 116 through an audio output interface such as speakers or headphones connected to a computing device.

The user 116 is enabled to input user feedback 118 indicating perceptual deviations between the modified speech output and the user's self-perceived inner voice. The user feedback 118 can provide input into the model transformation engine 112 to generate updated model transformation(s) 114, which can be iteratively applied to the parameter set corresponding to the provisional inner voice model 108. The user 116 provides the user feedback 118 through interaction elements such as GUI controls or A/B comparison interfaces. The model transformation engine 112 can process the user feedback 118 by determining delta values representing the difference between the current acoustic parameter set of the provisional inner voice model 108 and the target acoustic parameter values indicated by the user feedback 118. The model transformation engine 112 can generate updates to the model transformation(s) 114 by combining the delta values from the user feedback 118 with the previously applied model transformation(s) 114 to generate a cumulative set of acoustic parameter adjustment values. The speech generation platform 104 applies the updated model transformation(s) 114 to the parameter set corresponding to the provisional inner voice model 108 by modifying the acoustic parameter set and generating new synthesized speech output that incorporates the cumulative adjustments.

The iterative refinement process continues through multiple feedback cycles until either a threshold number of iterations is reached and/or the user 116 indicates satisfaction with the perceptual alignment between the modified speech output and the self-perceived inner voice. The speech generation platform 104 can track the number of completed feedback cycles by incrementing a counter each time the user 116 provides user feedback 118 and/or the model transformation engine 112 generates updated model transformation(s) 114. The speech generation platform 104 can compare the counter value against a predetermined threshold number of iterations such as 5, 10, or 20 iterations and terminate or otherwise prevent additional iterations when the counter reaches the threshold value. In some implementations, the speech generation platform 104 monitors convergence of the acoustic parameter adjustment values by determining a change magnitude metric that quantifies the difference between successive sets of model transformation(s) 114 across consecutive iterations. The speech generation platform 104 can generate the change magnitude metric by performing one or more operations such as determining the Euclidean distance or mean absolute difference between acoustic parameter values in the current model transformation(s) 114 and the previous model transformation(s) 114. The speech generation platform 104 terminates or otherwise prevents the iterative refinement process when the change magnitude metric falls below a convergence threshold value, thus indicating that successive adjustments are producing diminishing perceptual changes. The user 116 can explicitly indicate satisfaction, such as by activating a confirmation control in the GUI or by declining to make further selections in the A/B testing interface.

The parameter set corresponding to the resulting inner voice model can be stored as the parameter set corresponding to a final inner voice model 120 that synthesizes speech matching the user's self-perceived inner voice. The parameter set corresponding to the final inner voice model 120 includes the trained neural network weights and/or biases from the voice cloning engine 106 that encode the speaker's external voice characteristics along with the cumulative acoustic parameter adjustment values derived from the model transformation(s) 114 and/or user feedback 118. The final inner voice model 120 is enabled to take as input a parameterized representation of the speaker's voice that indicates characteristics such as fundamental frequency, formant structure, spectral envelope characteristics, prosodic patterns, and so forth. The final inner voice model 120 can use the input to output an audio output (e.g., synthesized speech) in accordance with the parameter set corresponding to the final inner voice model 120.

The speech generation platform 104 stores the parameter set corresponding to the final inner voice model 120 in a data structure that associates the model parameters with a user identifier to enable retrieval and deployment in downstream applications. The speech generation platform 104 can deploy the final inner voice model 120 across various applications including message delivery systems, therapeutic interventions, educational content presentation, personal assistant interfaces, and so forth. The speech in the user's self-perceived inner voice increases a degree of trust, reduces psychological resistance, and improves message acceptance from the user.

In some implementations, the speech generation platform 104 operates in accordance with one or more guidelines that include one or more constraints for inner voice message delivery using the final inner voice model 120. The speech generation platform 104 can implement, for example, an explicit consent protocol where the user 116 provides affirmative approval before the final inner voice model 120 is activated for message delivery in an application. The speech generation platform 104 can present a consent interface through a GUI or any other interface. In some implementations, the speech generation platform 104 applies source watermarking by embedding subconscious acoustic markers into the synthesized speech output generated by the final inner voice model 120 that indicate external origin. The source watermarking introduces subtle periodic modulations in amplitude or frequency that operate below the threshold of conscious perception but enable the brain to distinguish synthesized inner voice messages from naturally generated internal speech. The acoustic markers can include low-amplitude frequency modulations that are imperceptible to conscious awareness.

The speech generation platform 104 can enforce content boundaries that prohibit particular message types from being transmitted to an input layer of the final inner voice model 120. The prohibited categories can include, for example, commercial advertising, political messaging, deceptive content, and so forth. The speech generation platform 104 classifies content into allowed or prohibited categories. In some implementations, while content is not in a prohibited category, the speech generation platform 104 implements frequency limits that prevent overwhelming the user's natural inner dialogue by restricting the number of inner voice messages delivered within specified time periods. The speech generation platform 104 maintains a message delivery counter that tracks how many messages have been delivered to the user 116 through the input layer of the final inner voice model 120 within rolling time windows such as the past hour, the past day, or the past week. The speech generation platform 104 compares the message delivery counter against predetermined threshold values. When the message delivery counter reaches or exceeds the threshold value for a time window, the speech generation platform 104 blocks delivery of additional inner voice messages until sufficient time has elapsed for the counter to fall below the threshold.

The speech generation platform 104 can maintain an audit trail that records inner voice messages delivered to the user 116 through the input layer of the final inner voice model 120. The audit trail stores records in a database or log file where each record includes the message content, the delivery timestamp, contextual conditions, the requesting application that initiated the message delivery, user responses or actions, and so forth.

Figure 2:
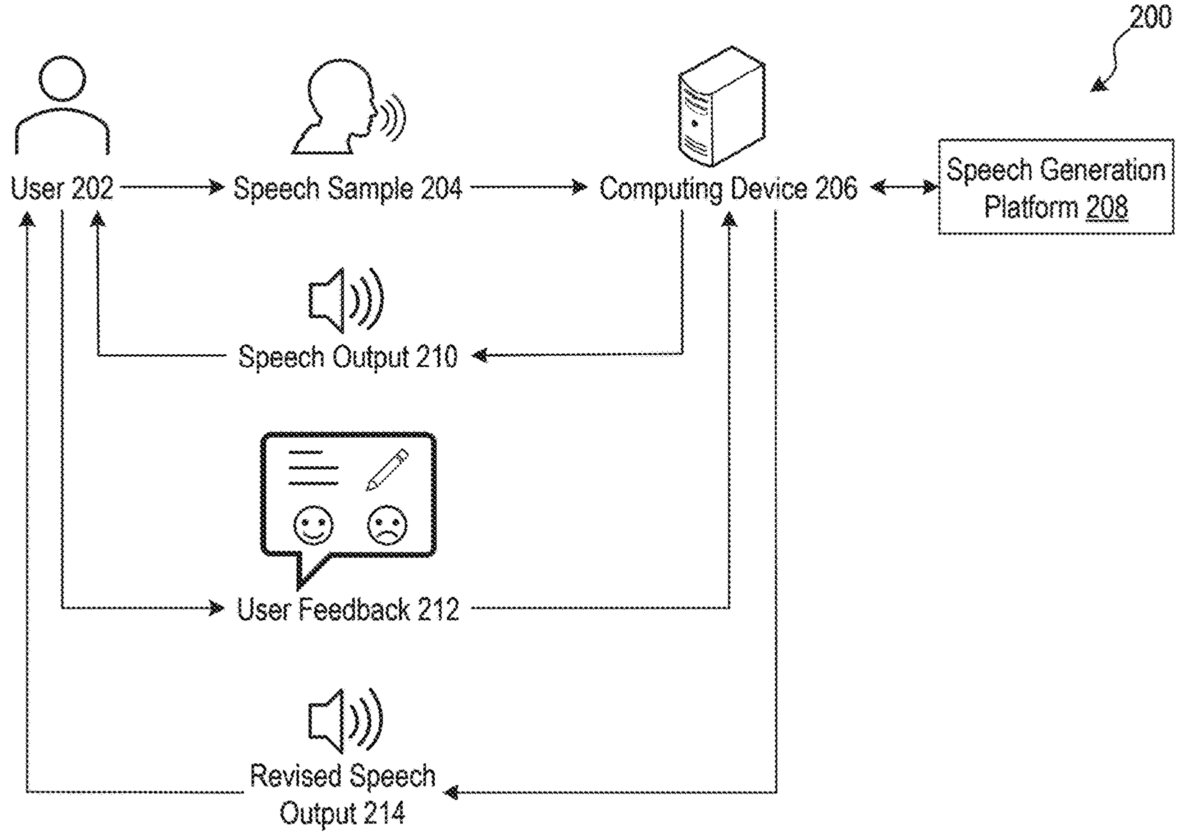
FIG. 2 shows a schematic illustrating an example environment of modifying (e.g., revising) speech signals (e.g., speech outputs) using a speech generation platform, in accordance with some implementations of the present technology.

FIG. 2 shows a schematic illustrating an example environment 200 of modifying (e.g., revising) speech output using a speech generation platform, in accordance with some implementations of the present technology. The environment 200 can be implemented using components of example computer system 700 illustrated and described in more detail with reference to FIG. 7. Likewise, implementations of example environment 200 can include different and/or additional components or can be connected in different ways.

The environment 200 illustrates a user 202 submitting a speech sample 204, such as the speech sample 102 in FIG. 1, to a computing device 206 through an audio input interface. In some implementations, the audio input interface includes a microphone that captures acoustic signals from the user 202 speaking into the microphone and converts the acoustic signals into digital audio data. The microphone can be integrated into the computing device 206 as an internal component or connected to the computing device 206 as an external peripheral device through a wired connection such as USB or a wireless connection such as Bluetooth. The computing device 206 receives the digital audio data from the microphone and stores the digital audio data as the speech sample 204.

In some implementations, the audio input interface includes an audio file upload element that presents a GUI (or other type of interface) control enabling the user 202 to select a pre-recorded audio file from local storage on the computing device 206 or from remote storage accessible through a network connection. The audio file upload element can implement a file selection dialog that displays available audio files and accepts user selection through mouse clicks or other gestures. The computing device 206 reads the selected audio file and loads the audio data contained in the file as the speech sample 204.

The computing device 206 can be communicatively connected to a speech generation platform 208, such as the speech generation platform 104 in FIG. 1, through a network communication channel. The network communication channel establishes data transmission pathways between the computing device 206 and the speech generation platform 208 to enable exchange of audio data, model parameters, synthesized speech outputs, and so forth. The communicative connection between the computing device 206 and the speech generation platform 208 can be implemented through various computational architectures that distribute processing operations differently between local and remote computing resources.

In some implementations, the speech generation platform 208 operates using local processing, where the speech generation platform 208 executes entirely on the computing device 206 using on-device processing resources. The computing device 206 stores all components of the speech generation platform 208, including the voice cloning engine 106 and the model transformation engine 112 from FIG. 1, in local memory such as RAM or persistent storage. The computing device 206 performs speech synthesis operations using its central processing unit (CPU), graphics processing unit (GPU), and/or specialized neural processing unit (NPU). The local processing architecture maintains the speech sample 204, the parameter set corresponding to the provisional inner voice model 108, and the parameter set corresponding to the final inner voice model 120 on the computing device 206 without transmitting audio data or model parameters to external servers. This approach provides data privacy by preventing sensitive voice data from leaving the computing device 206 and enables operation without network connectivity.

In some implementations, the speech generation platform 208 operates using remote processing where the speech generation platform 208 executes on a remote server and the computing device 206 transmits the speech sample 204 to the remote server. The computing device 206 establishes a network connection to the remote server through a wireless network interface, cellular data connection, wired network interface, and the like. The computing device 206 can format the speech sample 204 in network packets and transmit the packets to the remote server. The remote server receives the speech sample 204 and executes the voice cloning engine 106 to generate the parameter set corresponding to the provisional inner voice model 108 and executes the model transformation engine 112 to apply acoustic parameter adjustment values based on the demographic data 110 from FIG. 1. The remote server generates synthesized speech output using the parameter set corresponding to the provisional inner voice model 108 and transmits the synthesized audio waveforms back to the computing device 206 through the network connection. The computing device 206 receives the synthesized speech output and presents the audio to the user 202 through the audio output interface. This approach enables the remote server to maintain more computationally intensive models and larger training datasets.

Additionally or alternatively, the speech generation platform 208 operates using federated learning where multiple edge devices including the computing device 206 collaboratively train shared models while maintaining local data storage, as described in further detail with reference to FIG. 3. In some implementations, the speech generation platform 208 operates using hybrid architectures where different processing operations are distributed between the computing device 206 and remote servers based on computational requirements and data privacy considerations. The voice cloning operations that process the speech sample 204 to generate the parameter set corresponding to the provisional inner voice model 108 can execute locally on the computing device 206 to prevent transmitting sensitive audio data containing the user's voice over the network. The computing device 206 can apply the voice cloning engine 106 to the speech sample 204 using local processing resources and store the resulting parameter set corresponding to the provisional inner voice model 108 in local memory. The model transformation operations can execute remotely on a server that maintains the trained machine learning model and aggregated demographic transformation data from multiple users. Thus, the computing device 206 transmits only the demographic data 110 such as age, gender, and anatomical characteristics to the remote server without transmitting the speech sample 204 or the parameter set corresponding to the provisional inner voice model 108. The remote server can apply the model transformation engine 112 to the demographic data 110 to generate the model transformation(s) 114 and transmit the transformation parameters back to the computing device 206. The computing device 206 can locally apply the model transformation(s) 114 to the parameter set corresponding to the provisional inner voice model 108 to generate modified speech output. Thus, the speech generation platform is enabled to keep voice data local while using server-side computational resources and aggregated training data.

The speech generation platform 208, via the computing device 206, can present the user 202 with a speech output 210 generated from a provisional inner voice model, such as the provisional inner voice model 108 in FIG. 1, by synthesizing audio waveforms from text input and transmitting the audio data to an audio output interface of the computing device 206. The text input can include personalized content related to a particular application, such as motivational affirmations for therapeutic use cases or instructional content for educational applications.

The user 202 is enabled to provide user feedback 212, such as the user feedback 118 in FIG. 1, to the speech generation platform 208 via the computing device 206 through input elements such as GUI controls to adjust acoustic parameters or A/B comparison selections that indicate perceptual preferences of the user. The user feedback 212 can quantify perceptual deviations between the speech output 210 and the user's self-perceived inner voice by specifying adjustments to acoustic parameters such as fundamental frequency, formant frequencies, spectral tilt, prosodic characteristics, and so forth.

The speech generation platform 208 processes the user feedback 212 by applying corresponding transformations to the acoustic parameter set of the provisional inner voice model and transmits a revised speech output 214 via the computing device 206 to the user 202. The revised speech output 214 can be an output of a final inner voice model, such as the final inner voice model 120 in FIG. 1, when the iterative refinement process has converged based on reaching a threshold number of iterations, achieving a change magnitude below a convergence threshold, or receiving explicit user confirmation of satisfaction. The revised speech output 214 can alternatively be an output of a modified provisional inner voice model that will undergo additional refinement iterations when convergence has not yet occurred, in which case the speech generation platform 208 continues to accept further user feedback 212 and apply additional acoustic parameter adjustment values through repeated cycles until the parameter set corresponding to the provisional inner voice model 108 is finalized as the parameter set corresponding to the final inner voice model 120.

Figure 3:
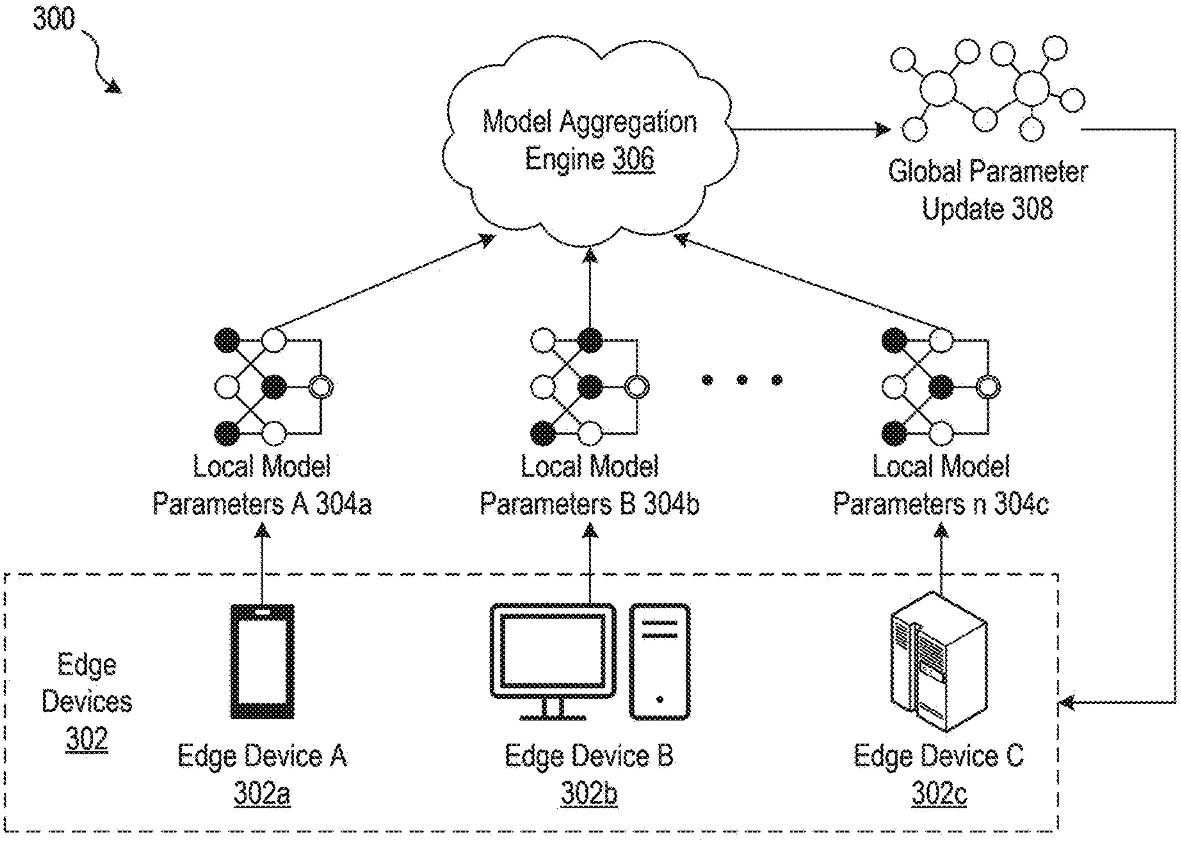
FIG. 3 shows a schematic illustrating an example environment of a federated learning architecture implemented using a speech generation platform, in accordance with some implementations of the present technology.

FIG. 3 shows a schematic illustrating an example environment 300 of a federated learning architecture implemented using a speech generation platform, in accordance with some implementations of the present technology. The environment 300 can be implemented using components of example computer system 700 illustrated and described in more detail with reference to FIG. 7. Likewise, implementations of example environment 300 can include different and/or additional components or can be connected in different ways.

The environment 300 illustrates a federated learning architecture including edge devices 302, such as a first edge device 302A, a second edge device 302B, a third edge device 302C, and additional edge devices up to an nth edge device. The edge devices 302 can include, for example, the computing device 206 in FIG. 2 and execute local instances of voice synthesis models and model transformation engines. Each edge device 302 operates as an independent computing system that stores and processes speech data locally without transmitting raw audio data to central servers. The edge devices 302 can include smartphones, laptop computers, tablet devices, and so forth. Each edge device 302 maintains a local instance of the parameter set corresponding to the provisional inner voice model 108 from FIG. 1 that has been adapted to the specific user associated with that edge device using processes described in FIG. 1 and FIG. 2. Each edge device 302 can maintain a local instance of the model transformation engine 112 from FIG. 1 that predicts acoustic parameter adjustment values to the parameter set corresponding to the provisional inner voice model based on, for example, demographic data.

Each edge device 302 generates local model parameters 304, such as a first local model parameter 304A generated by the first edge device 302A, a second local model parameter 304B generated by the second edge device 302B, a third local model parameter 304C generated by the third edge device 302C, and additional local model parameters corresponding to each additional edge device in the federated network. The local model parameters 304 can include gradient values generated through backpropagation during training of the model transformation engine 112 on the local edge device. The gradient values represent the partial derivatives of a loss function with respect to the neural network weights of the model transformation engine 112, where the loss function quantifies the difference between predicted acoustic parameter adjustment values and actual acoustic parameter adjustment values derived from user feedback 118 as described in FIG. 1. In some implementations, the local model parameters 304 include acoustic parameter adjustment values derived from user feedback data collected locally on each respective edge device 302 during iterative refinement of parameter sets corresponding to provisional inner voice models, where the adjustments quantify how demographic characteristics correlate with differences between externally perceived voices and self-perceived inner voices for the specific user of that edge device.

The local model parameters 304 from the edge devices 302 can be transmitted to a model aggregation engine 306 that is communicatively connected to each edge device 302 in the federated learning network. The model aggregation engine 306 operates on a central server or distributed computing infrastructure that receives local model parameters from multiple edge devices without receiving the raw speech samples or individual acoustic parameter sets that remain stored locally on the edge devices 302. The edge devices 302 can transmit the local model parameters 304 to the model aggregation engine 306 at scheduled intervals such as daily or weekly, after completing a specified number of local training iterations, in response to trigger events, after accumulation of a threshold amount of new training data from user feedback, and so forth.

The model aggregation engine 306 applies aggregation operations to combine the local model parameters 304 from multiple edge devices 302. In some implementations, the model aggregation engine 306 applies weighted averaging where each edge device's local model parameters 304 are multiplied by a weight factor before being summed together and divided by the total weight. The weight factors can be proportional to the number of training samples processed on each edge device such that edge devices with more user feedback data contribute more strongly to the aggregated result. In some implementations, the model aggregation engine 306 applies federated averaging (FedAvg) where the local model parameters 304 representing weight updates are averaged across all participating edge devices to compute a global weight update. The federated averaging operation determines the mean of corresponding weight values across all edge devices for each parameter in the model transformation engine 112. In some implementations, the model aggregation engine 306 applies demographic-weighted aggregation where the contribution of each edge device's local model parameters 304 is weighted based on a degree of demographic similarity to a target demographic profile. The model aggregation engine 306 determines/generates similarity scores between the demographic data associated with each edge device's user and the target demographic profile by measuring distances in a demographic feature space and applies higher weights to local model parameters from edge devices with users having demographic characteristics closer (in distance) to the target profile.

The model aggregation engine 306 can generate one or more global parameter update(s) 308 representing consensus acoustic transformation patterns learned across the federated network. The global parameter update(s) 308 include updated weights for the neural network layers of the model transformation engine 112 that have been refined by aggregating learning from multiple users across the edge devices 302. The global parameter update(s) 308 can include updated bias values that shift the baseline predictions of the model transformation engine 112, updated transformation matrices that define linear or nonlinear mappings between demographic feature vectors and acoustic parameter adjustment value vectors, and other adjustments. The model aggregation engine 306 transmits the global parameter update(s) 308 back to the edge devices 302. Each edge device 302 receives the global parameter update(s) 308 and incorporates them into its local model transformation engine 112 by replacing the current neural network weights with the updated weights from the global parameter update(s) 308 and/or by blending the global updates with the local weights. Each edge device 302 can use the updated model transformation engine 112 to increase prediction accuracy for generating transformations to the parameter set corresponding to the provisional inner voice model based on demographic data as described in FIG. 1, where the improved predictions can reduce the number of iterative refinement cycles needed for new users to achieve perceptual alignment between synthesized speech and their self-perceived inner voice.

Figure 4:
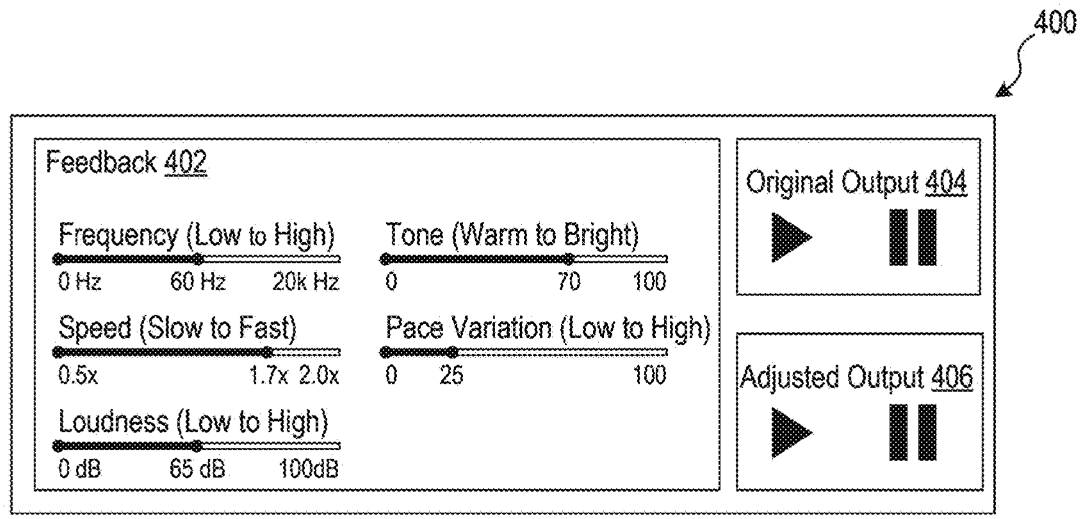
FIG. 4 shows a schematic illustrating an example environment of a feedback module within a speech generation platform, in accordance with some implementations of the present technology.

FIG. 4 shows a schematic illustrating an example environment 400 of a feedback module within a speech generation platform, in accordance with some implementations of the present technology. The environment 400 can be implemented using components of example computer system 700 illustrated and described in more detail with reference to FIG. 7. Likewise, implementations of example environment 400 can include different and/or additional components or can be connected in different ways.

The environment 400 illustrates a feedback module that includes a feedback input element 402 enabling a user to adjust acoustic parameters of synthesized speech output from a provisional inner voice model such as the provisional inner voice model 108 in FIG. 1. The feedback input element 402 provides interactive controls that map user interface interactions to specific acoustic parameter values. In some implementations, the feedback input element 402 includes slider bars that present horizontal or vertical tracks along which the user drags a slider handle to specify continuous parameter values within defined ranges. In some implementations, the feedback input element 402 includes rotary knobs that the user rotates clockwise or counterclockwise to increase or decrease parameter values in a manner analogous to physical audio equipment controls. In some implementations, the feedback input element 402 includes input fields that accept typed numeric/text values or increment/decrement buttons that adjust values in discrete steps.

For example, the feedback input element 402 includes button selections that present predefined parameter presets such as "warmer voice" or "brighter voice" that apply coordinated adjustments across multiple acoustic parameters. Each interactive control in the feedback input element 402 corresponds to a particular acoustic parameter (e.g., dimension) of the provisional inner voice model, including fundamental frequency that controls perceived pitch, tonal quality parameters that control spectral envelope characteristics, speech rate that controls temporal duration of phonemes and words, pacing patterns that control pause durations between phrases, loudness levels that control amplitude, and so forth.

The feedback module can enable the user to listen to an original output 404 generated by the provisional inner voice model prior to user-specified adjustments. The original output 404 represents synthesized speech using acoustic parameters determined by the model transformation engine 112 based on demographic data 110 as described in FIG. 1. The feedback module generates the original output 404 by applying the provisional inner voice model 108 to text input using the acoustic parameter set that includes the model transformation(s) 114 predicted from the demographic data but does not include user-specified adjustments from the feedback input element 402. The feedback module presents the original output 404 to the user through an audio output interface and can provide a playback control button the user activates to hear the original output 404.

The feedback module can enable the user to listen to an adjusted output 406 generated by the provisional inner voice model after applying user-specified adjustments from the feedback input element 402. The adjusted output 406 reflects modifications to the acoustic parameter set based on the user's manipulation of the interactive controls in the feedback input element 402. The feedback module captures the current positions or values of the interactive controls and converts these interface states into acoustic parameter adjustment values. The feedback module applies these adjustment values to the acoustic parameter set of the provisional inner voice model 108 to generate a modified acoustic parameter set. The feedback module synthesizes the adjusted output 406 by processing the same input used for the original output 404 through the provisional inner voice model 108 using the modified acoustic parameter set.

The user is enabled to continue making adjustments through multiple iterations until the adjusted output 406 perceptually matches the user's self-perceived inner voice based on the user's subjective evaluation of acoustic similarity. At this point, the feedback module captures the acoustic parameter values corresponding to the current slider positions and stores these values as part of the parameter set corresponding to the final inner voice model 120 as described in FIG. 1.

Example Implementations of Using the Speech Generation Platform

Figure 5:
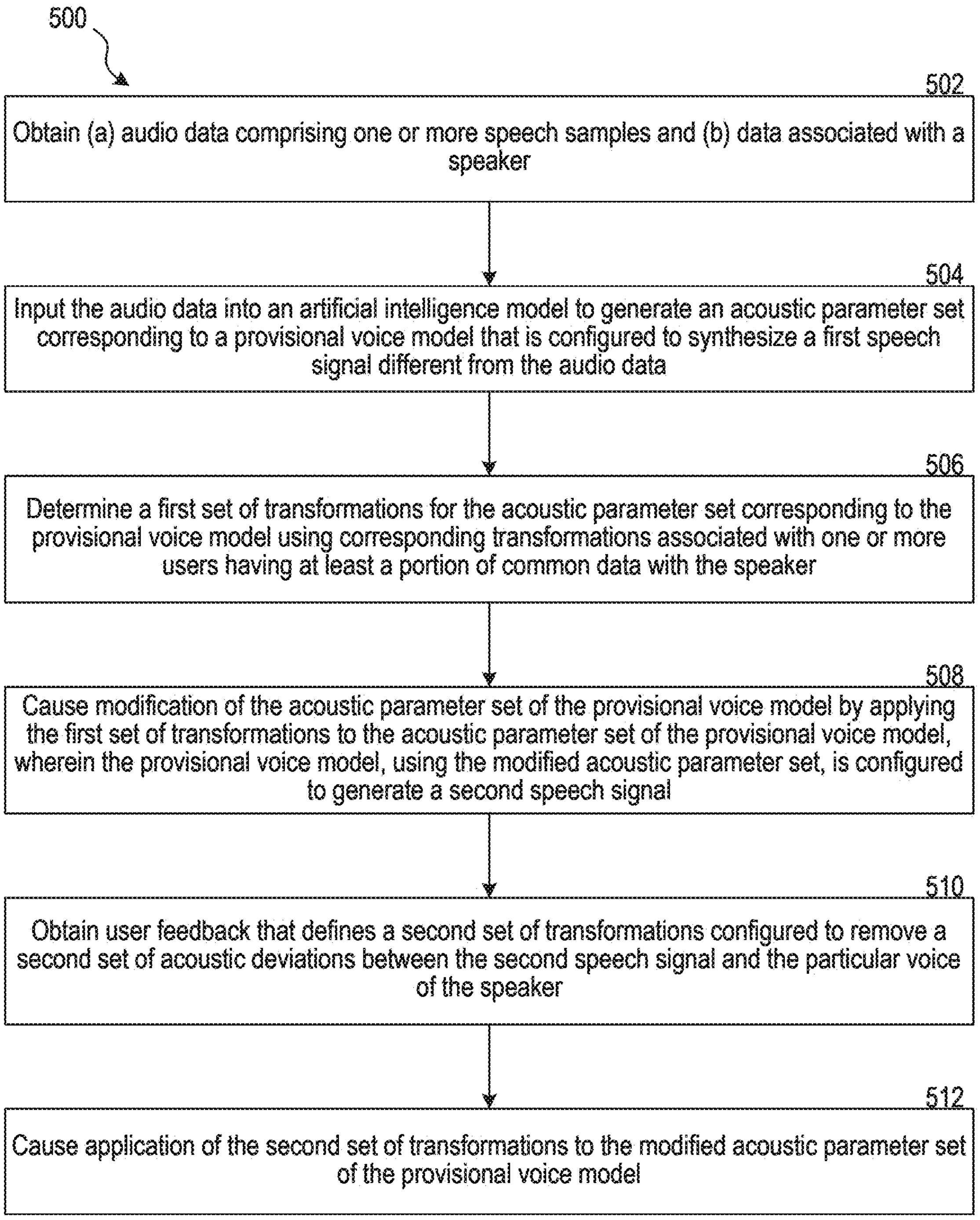
FIG. 5 is a flow diagram illustrating an example process of generating personalized inner voice audio output using a speech generation platform, in accordance with some implementations of the present technology.

FIG. 5 is a flow diagram illustrating an example process 500 of generating personalized inner voice audio output using a speech generation platform, in accordance with some implementations of the present technology. In some implementations, the process 500 is performed by a computer system, e.g., example computer system 700 illustrated and described in more detail with reference to FIG. 7. Implementations can include different and/or additional operations or can perform the operations in different orders.

In operation 502, the speech generation platform can obtain (e.g., receive or access from the interface of the computing device) audio data including one or more speech samples from a speaker (or any sample, such as a reference sample not from a speaker) and/or demographic data associated with the speaker. The speech generation platform can receive the audio data through an audio input interface of a computing device as described in FIG. 2, where the audio input interface captures acoustic signals through a microphone or accepts pre-recorded audio files through a file upload module. The audio data represents an external voice of the speaker as captured through air conduction. The speech generation platform can receive the demographic data through user input forms presented in a GUI where the speaker enters information about themselves, through automated inference by evaluating the audio data to estimate demographic characteristics, or through retrieval from stored user profile data associated with the speaker's account. The demographic data can include age, gender, ethnicity, language proficiency, an anatomical characteristic of the speaker, and so forth. The speech generation platform stores the demographic data as the demographic data 110 described in FIG. 1 for subsequent input to the model transformation engine 112.

In some implementations, the speech generation platform obtains the audio data through audio capture devices that record sound from positions proximate to the speaker's auditory perception pathways. For example, the audio data is captured through earbuds or in-ear monitors (e.g., hearing aids) that include integrated microphones positioned within or adjacent to the speaker's ear canal. The earbuds can capture acoustic signals that include both air-conducted sound from the speaker's mouth and bone-conducted sound transmitted through the skull and jaw structures, which provides a mixed acoustic signal that approximates the speaker's self-perceived voice compared to external microphone recordings that capture only air-conducted sound. The audio data, in some examples, is captured via hearing aids that include microphones positioned in the ear canal or behind the ear, where the hearing aids record sound during the speaker's speech production.

The speech generation platform can apply the model transformation engine 112 described in FIG. 1 to predict acoustic parameter adjustments based on the mixed acoustic signal. In some implementations, the model transformation engine 112 is trained on datasets that include recordings from both external microphones and ear-positioned microphones to identify the relationship between different recording positions and the speaker's self-perceived inner voice. The use of ear-positioned audio capture devices reduces the magnitude of acoustic parameter adjustments needed to transform the recorded voice into the self-perceived inner voice because the captured audio already includes bone-conducted components, thereby enabling the speech generation platform to generate more accurate provisional inner voice models with fewer iterative refinement cycles to achieve perceptual alignment with the speaker's inner voice.

In operation 504, the speech generation platform can input the audio data into a first machine learning model (or any AI model such as those described with reference to the voice cloning engine 106 in FIG. 1) to generate a parameter set corresponding to a provisional inner voice model (or any voice model) structured to synthesize a first speech output different from the audio data. The first speech output of the provisional inner voice model can share one or more acoustic characteristics of the external voice of the speaker. In some implementations, the first speech output of the provisional inner voice model differs from the audio data because the provisional inner voice model is structured to synthesize new speech from input rather than replaying the recorded audio.

In operation 506, the speech generation platform can input the demographic data associated with the speaker into a second machine learning model (the same as or different from the first machine learning model) to generate a first set of transformations. The second machine learning model can be trained on a dataset of acoustic parameters derived from a plurality of users. Each user can be associated with corresponding demographic data and/or one or more corresponding transformations that map a corresponding external voice of the user to a corresponding perceived inner voice of the user. The training dataset can include records from users who have completed the iterative refinement process described in FIG. 1 and FIG. 2. Each record can capture the demographic attributes of the user and the cumulative acoustic parameter adjustment values that were applied to align their voice clone with their self-perceived inner voice.

The second machine learning model can identify a subset of the plurality of users having at least a portion of common demographic data with the speaker. In some implementations, the second machine learning model generates the first set of transformations using the corresponding transformations associated with the identified subset of the plurality of users. The second machine learning model can generate scores between the speaker and each training user by measuring distances in a demographic feature space, where closer distances indicate greater demographic similarity. The second machine learning model can select users whose demographic attributes match the speaker's attributes within specified tolerance ranges as the identified subset. In some implementations, the second machine learning model generates the first set of transformations using the corresponding transformations associated with the identified subset of the plurality of users by determining weighted averages of the acoustic parameter adjustment values from the identified subset, where the weights are proportional to the demographic similarity scores.

The speech generation platform can use a consistent phrase (e.g., "The quick brown fox jumps over the lazy dog") to identify the demographic profile of a user/speaker by finding closest match of voice in other databases. For example, the speech generation platform obtains a standardized speech sample that represents a recitation of a predetermined phrase by the speaker. The speech generation platform compares one or more acoustic characteristics of the standardized speech sample to a reference database that includes standardized speech samples from a plurality of reference users and identifies a matching reference user using the comparison. The speech generation platform can determine the demographic data associated with the speaker using demographic data associated with the matching reference user.

In some implementations, the speech generation platform performs an initial adjustment of parameters of the provisional inner voice model. The first set of transformations includes, for example, a predefined frequency offset value structured to decrease a frequency parameter of the provisional inner voice model. In some implementations, the predefined frequency offset value can be approximately 20 Hz to 30 Hz for male speakers or approximately 10 Hz to 15 Hz for female speakers. The speech generation platform applies this frequency offset to the parameters of the provisional inner voice model to shift the baseline pitch before presenting the synthesized speech to the user for evaluation.

The second artificial intelligence model can be trained using one or more retrieval-augmented generation (RAG) operations that retrieve the first set of transformations from a vector database that includes embeddings of corresponding demographic data and the corresponding transformations associated with the one or more users. The second artificial intelligence model can encode the speaker's demographic data into a query embedding vector using an encoder network. The second artificial intelligence model can perform a similarity search in the vector database by computing metrics such as dot products or cosine similarities between the query embedding and the stored demographic embeddings. The second artificial intelligence model thus is enabled to retrieve the transformations associated with the greatest (or otherwise greater) degree of similarity between demographic embeddings and generates the first set of transformations by combining and/or averaging the retrieved transformations.

In some implementations, the second artificial intelligence model includes a transformer-based architecture with one or more context windows structured to use historical acoustic transformation data from the one or more users to generate the first set of transformations. The transformer-based architecture processes sequences of historical transformation records where each record includes demographic features and corresponding acoustic parameter adjustment values. The context windows enable the transformer to generate the first set of transformations by weighting the contributions of different historical records according to the degree of demographic similarity.

In operation 508, the speech generation platform can modify an acoustic parameter set of the provisional inner voice model by applying the first set of transformations to the acoustic parameter set of the provisional inner voice model to generate a second speech output. The second speech output can enable removal of a first set of acoustic deviations between the first speech output and a perceived inner voice of the speaker. The acoustic parameter set can include a fundamental frequency, a formant frequency, a spectral envelope characteristic, a prosodic parameter, a harmonic-to-noise ratio, a jitter, a shimmer, and so forth. The inner voice model can be used to generate singing content. For example, the second speech output is musical content that represents a singing audio output by applying pitch modulation to follow musical note sequences and/or temporal stretching to match rhythmic patterns.

The speech generation platform can identify how a person's voice sounds like and what the person's voice does not sound like (e.g., English language can vary tones more) to generate a positive and negative overlay for parameter set corresponding to the inner voice model. For example, the speech generation platform can evaluate the audio data to identify one or more positive acoustic characteristics present in the external voice of the speaker and one or more negative acoustic characteristics absent from the external voice of the speaker. Thus, the first set of transformations can maintain the one or more positive acoustic characteristics and suppress the one or more negative acoustic characteristics in the second speech output (e.g., even if they are predicted based on demographic patterns).

In scenarios where the user/speaker speaks multiple languages, the speech generation platform can adapt the parameter set corresponding to the inner voice model based on one or more languages associated with the user/speaker. For example, where the audio data includes corresponding speech samples in multiple languages, the speech generation platform can identify one or more language-specific phonemes in the audio data and apply the first set of transformations to the acoustic parameter set of the provisional inner voice model using the one or more language-specific phonemes.

Circumstances of the user/speaker (e.g., not enough sleep, drunk, financial hardship time, stress) can change the parameter set corresponding to the inner voice model. For example, the speech generation platform can obtain contextual state data indicating at least one condition (e.g., sleep deprivation level, stress level, or intoxication level) of the speaker. The speech generation platform can determine the first set of transformations using the contextual state data.

In some implementations, the speech generation platform causes presentation of the second speech output generated by the provisional inner voice model to an interface of a computing device. In operation 510, the speech generation platform can receive (e.g., obtain or access from the interface of the computing device), user feedback that defines a second set of transformations structured to enable removal of a second set of acoustic deviations between the second speech output and the perceived inner voice of the speaker. In some implementations, the user feedback is received via a GUI that includes a plurality of adjustable controls, each adjustable control corresponding to a respective acoustic parameter in the acoustic parameter set. The second set of transformations can be generated based on one or more adjustment values received from the plurality of adjustable controls. In an A/B testing scenario, the interface can present pairs of second speech outputs with different acoustic parameter sets. The second set of transformations can be generated by bracketing one or more acoustic parameter values based on a user selection of a particular second speech output within each pair of second speech outputs. The particular second speech output can align with the perceived inner voice of the speaker to a greater degree than a different second speech output in the pair of second speech outputs.

In operation 512, the speech generation platform can apply the second set of transformations to the modified acoustic parameter set of the provisional inner voice model. The speech generation platform can store the modified acoustic parameter set, subsequent to applying the second set of transformations, as a parameter set corresponding to a finalized inner voice model. The finalized inner voice model can be used to generate speech. For example, the finalized inner voice model can generate a message audio output using the finalized inner voice model in accordance with a text input. The message audio output can match (or otherwise align with) the perceived inner voice of the speaker.

The inner voice model can follow you from device to device (e.g., phone, computer, car). For example, the speech generation platform can synchronize the modified acoustic parameter set, subsequent to applying the second set of transformations, across a plurality of computing devices associated with the speaker. Each computing device can generate a corresponding speech output using the modified acoustic parameter set, subsequent to applying the second set of transformations.

In an edge device approach, the causing modification of the acoustic parameter set is performed locally on an edge computing device associated with the speaker. In a server approach, the causing modification of the acoustic parameter set includes transmitting the audio data and the demographic data to a remote server. The speech generation platform can perform the modification of the acoustic parameter set on the remote server. The speech generation platform can receive the modified acoustic parameter set from the remote server. In a federated learning approach, the speech generation platform establishes a communication channel with a plurality of edge computing devices, where each edge computing device is associated with a respective user and stores a respective local voice model. The speech generation platform receives, from each of the plurality of edge computing devices, one or more locally computed set of transformations generated using respective user feedback. The speech generation platform aggregates the locally computed set of transformations from the plurality of edge computing devices to generate a global set of transformations for a global provisional voice model and distributes the global set of transformations to the plurality of edge computing devices.

Example Implementation of the Models of the Speech Generation Platform

Figure 6:
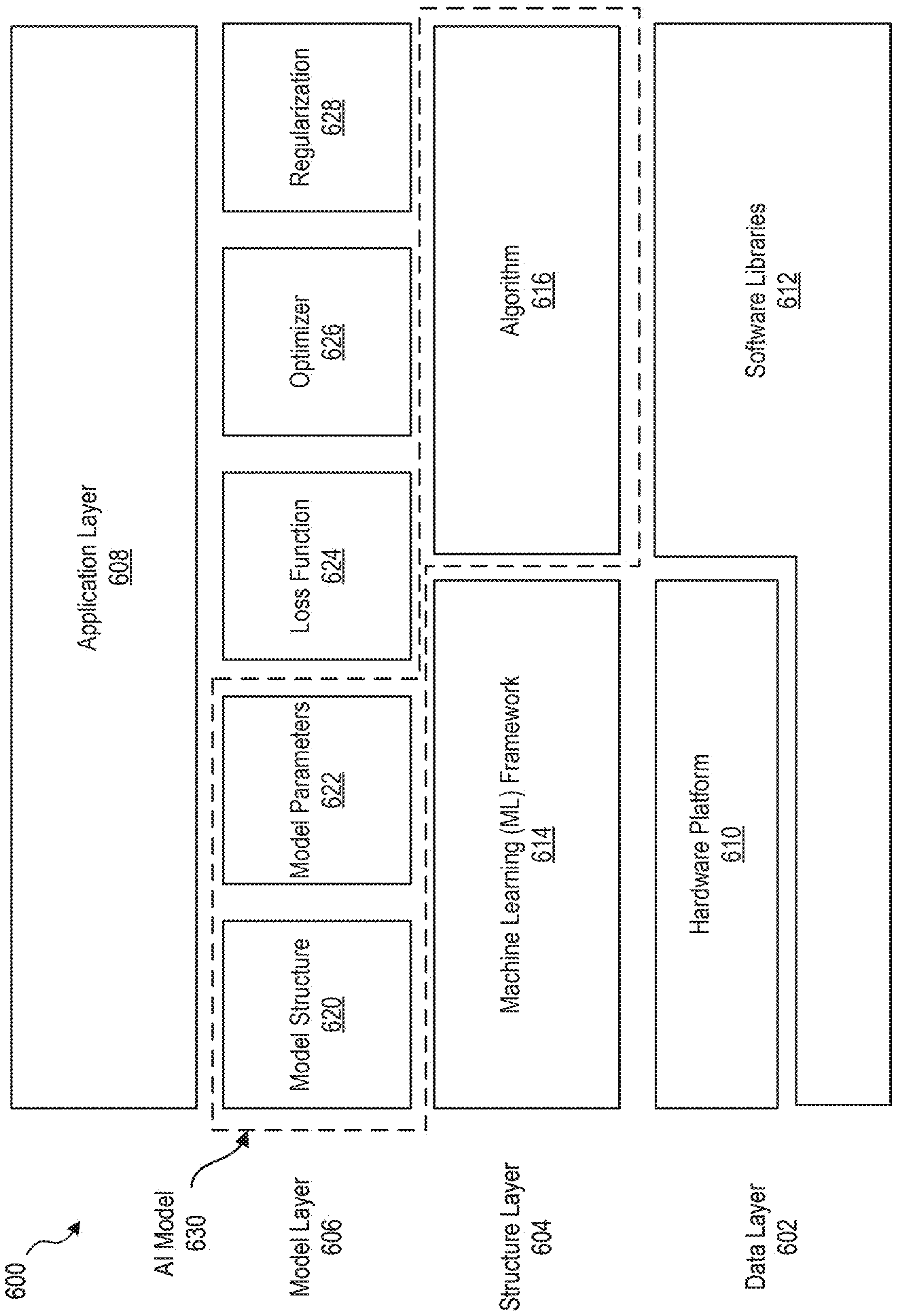
FIG. 6 illustrates a layered architecture of an AI system that can implement the machine learning models of a speech generation platform, in accordance with some implementations of the present technology.

FIG. 6 illustrates a layered architecture of an AI system 600 that can implement the ML models of the speech generation platform of FIG. 6, in accordance with some implementations of the present technology. Example ML models can include the models executed by the speech generation platform, such as the voice cloning engine 105, the provisional inner voice model 108, the model transformation engine 112, and/or the final inner voice model 120. Accordingly, the voice cloning engine 106, the provisional inner voice model 108, the model transformation engine 112, and/or the final inner voice model 120 can include one or more components of the AI system 600.

As shown, the AI system 600 can include a set of layers, which conceptually organize elements within an example network topology for the AI system's architecture to implement a particular AI model. Generally, an AI model is a computer-executable program implemented by the AI system 600 that analyses data to make predictions. Information can pass through each layer of the AI system 600 to generate outputs for the AI model. The layers can include a data layer 602, a structure layer 604, a model layer 606, and an application layer 608. The algorithm 616 of the structure layer 604 and the model structure 620 and model parameters 622 of the model layer 606 together form an example AI model. The optimizer 626, loss function engine 624, and regularization engine 628 work to refine and optimize the AI model, and the data layer 602 provides resources and support for application of the AI model by the application layer 608.

The data layer 602 acts as the foundation of the AI system 600 by preparing data for the AI model. As shown, the data layer 602 can include two sub-layers: a hardware platform 610 and one or more software libraries 612. The hardware platform 610 can be designed to perform operations for the AI model and include computing resources for storage, memory, logic and networking, such as the resources described in relation to FIGS. 7 and 8. The hardware platform 610 can process amounts of data using one or more servers. The servers can perform backend operations such as matrix calculations, parallel calculations, machine learning (ML) training, and the like. Examples of servers used by the hardware platform 610 include CPUs and GPUs. CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 610 can include computing resources, (e.g., servers, memory, etc.) offered by a cloud services provider. The hardware platform 610 can also include computer memory for storing data about the AI model, application of the AI model, and training data for the AI model. The computer memory can be a form of random-access memory (RAM), such as dynamic RAM, static RAM, and non-volatile RAM.

The software libraries 612 can be thought of suites of data and programming code, including executables, used to control the computing resources of the hardware platform 610. The programming code can include low-level primitives (e.g., fundamental language elements) that form the foundation of one or more low-level programming languages, such that servers of the hardware platform 610 can use the low-level primitives to carry out specific operations. The low-level programming languages do not require much, if any, abstraction from a computing resource's instruction set architecture, enabling them to run quickly with a small memory footprint. Examples of software libraries 612 that can be included in the AI system 600 include INTEL Math Kernel Library, NVIDIA cuDNN, EIGEN, and OpenBLAS.

The structure layer 604 can include an ML framework 614 and an algorithm 616. The ML framework 614 can be thought of as an interface, library, or tool that enables users to build and deploy the AI model. The ML framework 614 can include an open-source library, an API, a gradient-boosting library, an ensemble method, and/or a deep learning toolkit that work with the layers of the AI system facilitate development of the AI model. For example, the ML framework 614 can distribute processes for application or training of the AI model across multiple resources in the hardware platform 610. The ML framework 614 can also include a set of pre-built components that have the functionality to implement and train the AI model and enable users to use pre-built functions and classes to construct and train the AI model. Thus, the ML framework 614 can be used to facilitate data engineering, development, hyperparameter tuning, testing, and training for the AI model. Examples of ML frameworks 614 that can be used in the AI system 600 include TENSORFLOW, PYTORCH, SCIKIT-LEARN, KERAS, LightGBM, RANDOM FOREST, and AMAZON WEB SERVICES.

The algorithm 616 can be an organized set of computer-executable operations used to generate output data from a set of input data and can be described using pseudocode. The algorithm 616 can include complex code that enables the computing resources to learn from new input data and create new/modified outputs based on what was learned. In some implementations, the algorithm 616 can build the AI model through being trained while running computing resources of the hardware platform 610. This training enables the algorithm 616 to make predictions or decisions without being explicitly programmed to do so. Once trained, the algorithm 616 can run at the computing resources as part of the AI model to make predictions or decisions, improve computing resource performance, or perform tasks. The algorithm 616 can be trained using supervised learning, unsupervised learning, semi-supervised learning, and/or reinforcement learning.

Using supervised learning, the algorithm 616 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of audio data in FIG. 1) from various source computing systems described in relation to FIG. 6. Furthermore, training data can include pre-processed data generated by various engines of the speech generation platform described in relation to FIG. 6. The user may label the training data based on one or more classes and trains the AI model by inputting the training data to the algorithm 616. The algorithm determines how to label the new data based on the labeled training data. The user can facilitate collection, labeling, and/or input via the ML framework 614. In some instances, the user may convert the training data to a set of feature vectors for input to the algorithm 616. Once trained, the user can test the algorithm 616 on new data to determine if the algorithm 616 is predicting accurate labels for the new data. For example, the user can use cross-validation methods to test the accuracy of the algorithm 616 and retrain the algorithm 616 on new training data if the results of the cross-validation are below an accuracy threshold.

Supervised learning can include classification and/or regression. Classification techniques include teaching the algorithm 616 to identify a category of new observations based on training data and are used when input data for the algorithm 616 is discrete. Said differently, when learning through classification techniques, the algorithm 616 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 616 can categorize new data by analyzing the new data for features that map to the categories. Examples of classification techniques include boosting, decision tree learning, genetic programming, learning vector quantization, KNN algorithm, and statistical classification.

Regression techniques include estimating relationships between independent and dependent variables and are used when input data to the algorithm 616 is continuous. Regression techniques can be used to train the algorithm 616 to predict or forecast relationships between variables. To train the algorithm 616 using regression techniques, a user can select a regression method for estimating the parameters of the model. The user collects and labels training data that is input to the algorithm 616 such that the algorithm 616 is trained to understand the relationship between data features and the dependent variable(s). Once trained, the algorithm 616 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning based pre-processing operations.

Under unsupervised learning, the algorithm 616 learns patterns from unlabeled training data. In particular, the algorithm 616 is trained to learn hidden patterns and insights of input data, which can be used for data exploration or for generating new data. Here, the algorithm 616 does not have a predefined output, unlike the labels output when the algorithm 616 is trained using supervised learning. Said another way, unsupervised learning is used to train the algorithm 616 to find an underlying structure of a set of data, group the data according to similarities, and represent that set of data in a compressed format. The speech generation platform can use unsupervised learning to identify patterns in claim history (e.g., to identify particular event sequences) and so forth. In some implementations, performance of the speech generation platform that can use unsupervised learning is improved because the incoming memories (e.g., audio data in FIG. 1) is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remains in a group that has less or no similarities to another group. Examples of clustering techniques density-based methods, hierarchical based methods, partitioning methods, and grid-based methods. In one example, the algorithm 616 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 616 may be trained to be an Isolation Forest, local outlier factor (LOF) algorithm, or KNN algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 616 include factor analysis, item response theory, latent profile analysis, and latent class analysis.

The model layer 606 implements the AI model using data from the data layer and the algorithm 616 and ML framework 614 from the structure layer 604, thus enabling decision-making capabilities of the AI system 600. The model layer 606 includes a model structure 620, model parameters 622, a loss function engine 624, an optimizer 626, and a regularization engine 628.

The model structure 620 describes the architecture of the AI model of the AI system 600. The model structure 620 defines the complexity of the pattern/relationship that the AI model expresses. Examples of structures that can be used as the model structure 620 include decision trees, support vector machines, regression analyses, Bayesian networks, Gaussian processes, genetic algorithms, and artificial neural networks (or, simply, neural networks). The model structure 620 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 620 may include one or more hidden layers of nodes between the input and output layers. The model structure 620 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 622 represent the relationships learned during training and can be used to make predictions and decisions based on input data. The model parameters 622 can weigh and bias the nodes and connections of the model structure 620. For instance, when the model structure 620 is a neural network, the model parameters 622 can weight and bias the nodes in each layer of the neural networks, such that the weights determine the strength of the nodes and the biases determine the thresholds for the activation functions of each node. The model parameters 622, in conjunction with the activation functions of the nodes, determine how input data is transformed into desired outputs. The model parameters 622 can be determined and/or altered during training of the algorithm 616.

The loss function engine 624 can determine a loss function, which is a metric used to evaluate the AI model's performance during training. For instance, the loss function engine 624 can measure the difference between a predicted output of the AI model and the actual output of the AI model and is used to guide optimization of the AI model during training to minimize the loss function. The loss function may be presented via the ML framework 614, such that a user can determine whether to retrain or otherwise alter the algorithm 616 if the loss function is over a threshold. In some instances, the algorithm 616 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 626 adjusts the model parameters 622 to minimize the loss function during training of the algorithm 616. In other words, the optimizer 626 uses the loss function generated by the loss function engine 624 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 626 used may be determined based on the type of model structure 620 and the size of data and the computing resources available in the data layer 602.

The regularization engine 628 executes regularization operations. Regularization is a technique that prevents over- and underfitting of the AI model. Overfitting occurs when the algorithm 616 is overly complex and too adapted to the training data, which can result in poor performance of the AI model. Underfitting occurs when the algorithm 616 is unable to recognize even basic patterns from the training data such that it cannot perform well on training data or on validation data. The optimizer 626 can apply one or more regularization techniques to fit the algorithm 616 to the training data properly, which helps constrain the resulting AI model and improves its ability for generalized application. Examples of regularization techniques include lasso (L1) regularization, ridge (L2) regularization, and elastic (L1 and L2 regularization).

The application layer 608 describes how the AI system 600 is used to solve problems or perform tasks. In an example implementation, the application layer 608 can include a front-end user interface of the speech generation platform.

Example Computing Environment of the Speech Generation Platform

Figure 7:
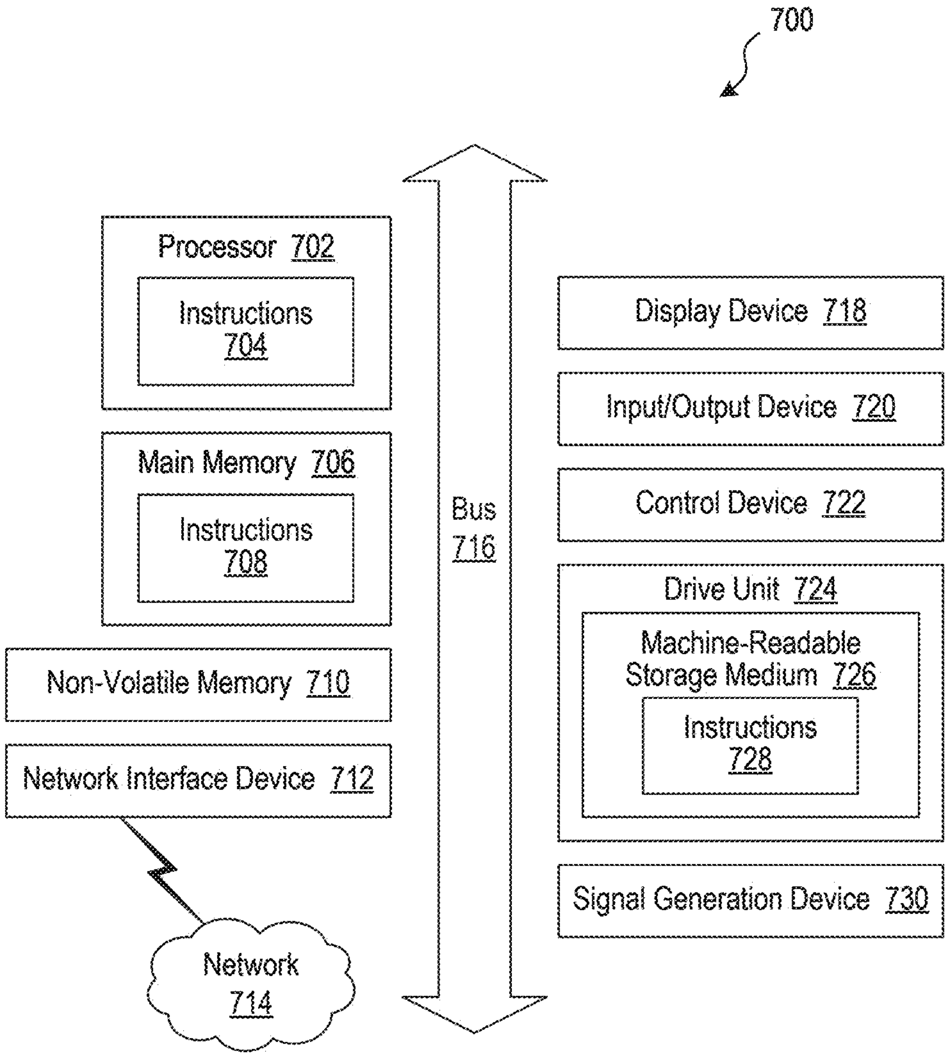
FIG. 7 is a block diagram showing some of the components typically incorporated in at least some of the computer systems and other devices on which the speech generation platform operates, in accordance with some implementations of the present technology.

FIG. 7 is a block diagram showing some of the components typically incorporated in at least some of the computer systems 700 and other devices on which the disclosed system operates in accordance with some implementations of the present technology. As shown, an example computer system 700 can include: one or more processors 702, main memory 706, non-volatile memory 710, a network interface device 712, video display device 718, an input/output device 720, a control device 722 (e.g., keyboard and pointing device), a drive unit 724 that includes a machine-readable medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real time, near real time, or in batch mode.

The network interface device 712 enables the computer system 700 to exchange data in a network 714 with an entity that is external to the computing system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 708, 728) set at various times in various memory and storage devices in computing device(s). When read and executed by the processor 702, the instruction(s) cause the computer system 700 to perform operations to execute elements involving the various aspects of the disclosure.

Figure 8:
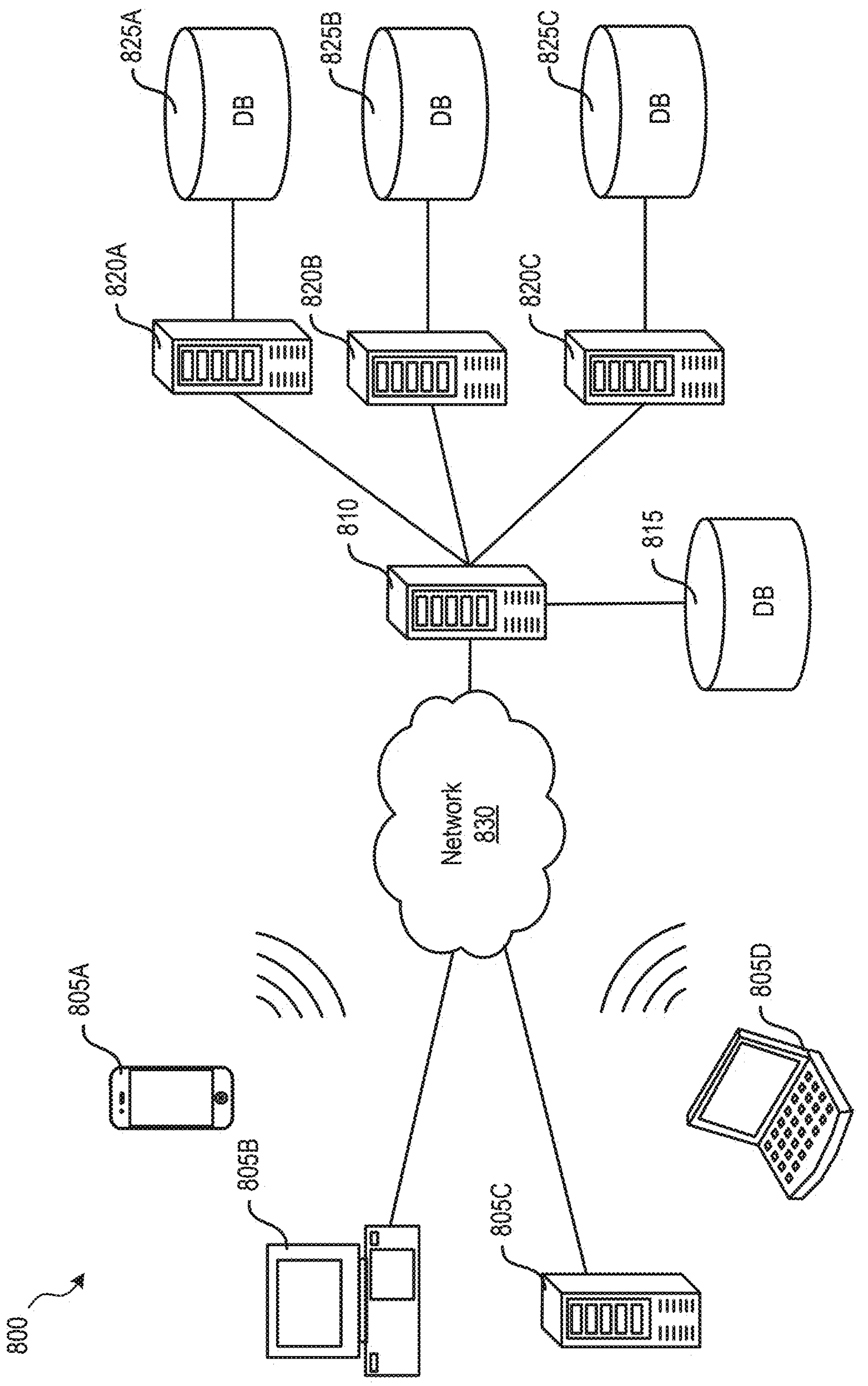
FIG. 8 is a system diagram illustrating an example of a computing environment in which the speech generation platform operates, in accordance with some implementations of the present technology.

FIG. 8 is a system diagram illustrating an example of a computing environment in which the disclosed system operates in some implementations. In some implementations, environment 800 includes one or more client computing devices 805A-D, examples of which can host the speech generation platform of FIG. 6. Client computing devices 805 operate in a networked environment using logical connections through network 830 to one or more remote computers, such as a server computing device.

In some implementations, server computing device 810 is an edge server which receives client requests and coordinates fulfillment of those requests through other servers, such as servers 820A-C. In some implementations, server computing devices 810 and 820 comprise computing systems, such as the speech generation platform of FIG. 6. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server or client devices. In some implementations, servers (810, 820A-C) connect to a corresponding database (815, 825A-C). As discussed above, each server computing device 820 can correspond to a group of servers, and each of these servers can share a database or can have its own database. Databases 815 and 825 warehouse (e.g., store) information such as claims data, email data, call transcripts, call logs, policy data and so on. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. In some implementations, network 830 is the Internet or some other public or private network. Client computing devices 805 are connected to network 830 through a network interface, such as by wired or wireless communication. While the connections between server computing device 810 and server computing devices 820 are shown as separate connections, these connections can be any kind of local, wide area, wired, or wireless network, including network 830 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 612(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

I claim:

1. A system comprising:

at least one hardware processor; and at least one non-transitory memory storing instructions, which, when executed by the at least one hardware processor, cause the system to:

receive (a) audio data comprising one or more speech samples from a speaker and (b) demographic data associated with the speaker, wherein the audio data represents an external voice of the speaker as captured through air conduction;

input the audio data into a first machine learning model to generate an acoustic parameter set corresponding to a provisional inner voice model, wherein the provisional inner voice model is configured to synthesize a first speech signal different from the audio data, wherein the first speech signal of the provisional inner voice model shares one or more acoustic characteristics of the external voice of the speaker;

input the demographic data associated with the speaker into a second machine learning model to generate a first set of transformations, wherein the second machine learning model is trained on a dataset of acoustic parameters derived from a plurality of users, each associated with (a) corresponding demographic data and (b) one or more corresponding transformations that map a corresponding external voice of the user to a corresponding perceived inner voice of the user, and wherein the second machine learning model is configured to:

identify a subset of the plurality of users having at least a portion of common demographic data with the speaker, and generate the first set of transformations using the corresponding transformations associated with the identified subset of the plurality of users;

modify the acoustic parameter set corresponding to the provisional inner voice model by applying the first set of transformations to the acoustic parameter set of the provisional inner voice model to generate a second speech signal, wherein the second speech signal enables removal of a first set of acoustic deviations between the first speech signal and a perceived inner voice of the speaker;

cause output of the second speech signal generated by the provisional inner voice model at a computing device;

receive, via the computing device, user feedback that defines a second set of transformations configured to remove a second set of acoustic deviations between the second speech signal and the perceived inner voice of the speaker; and apply the second set of transformations to the modified acoustic parameter set of the provisional inner voice model.

2. The system of claim 1, wherein the system is further caused to:

store the modified acoustic parameter set, subsequent to applying the second set of transformations, in association with a finalized inner voice model; and generate a message audio output using the finalized inner voice model in accordance with a text input, wherein the message audio output matches the perceived inner voice of the speaker.

3. The system of claim 1, wherein the acoustic parameter set comprises at least one of a fundamental frequency, a formant frequency, a spectral envelope characteristic, a prosodic parameter, a harmonic-to-noise ratio, a jitter, or a shimmer.

4. The system of claim 1, wherein the demographic data comprises at least one of age, gender, ethnicity, language proficiency, or an anatomical characteristic of the speaker.

5. A non-transitory computer-readable storage medium comprising instructions for generating personalized inner voice audio output stored thereon, wherein the instructions when executed by at least one data processor of a system, cause the system to:

obtain (a) audio data comprising one or more speech samples and (b) demographic data associated with a speaker;

input the audio data into a first artificial intelligence model to generate an acoustic parameter set corresponding to a provisional inner voice model that is configured to synthesize a first speech signal different from the audio data, wherein the first speech signal of the provisional inner voice model shares one or more acoustic characteristics of an external voice of the speaker;

input the demographic data associated with the speaker into a second artificial intelligence model to generate a first set of transformations, wherein the second artificial intelligence model is configured to generate the first set of transformations using corresponding transformations associated with one or more users having at least a portion of common demographic data with the speaker;

modify the acoustic parameter set corresponding to the provisional inner voice model by applying the first set of transformations to the acoustic parameter set of the provisional inner voice model to generate a second speech signal, wherein the second speech signal enables removal of a first set of acoustic deviations between the first speech signal and a perceived inner voice of the speaker;

obtain user feedback that defines a second set of transformations configured to remove a second set of acoustic deviations between the second speech signal and the perceived inner voice of the speaker; and apply the second set of transformations to the modified acoustic parameter set of the provisional inner voice model.

6. The non-transitory computer-readable storage medium of claim 5, wherein the second artificial intelligence model is trained using one or more retrieval-augmented generation (RAG) operations that retrieve the first set of transformations from a vector database comprising embeddings of corresponding demographic data and the corresponding transformations associated with the one or more users.

7. The non-transitory computer-readable storage medium of claim 5, wherein the second artificial intelligence model comprises a transformer-based architecture with one or more context windows configured to use historical acoustic transformation data from the one or more users to generate the first set of transformations.

8. The non-transitory computer-readable storage medium of claim 5, wherein the audio data comprises corresponding speech samples in multiple languages, and wherein the instructions further cause the system to:

identify one or more language-specific phonemes in the audio data, and apply the first set of transformations to the acoustic parameter set of the provisional inner voice model using the one or more language-specific phonemes.

9. The non-transitory computer-readable storage medium of claim 5, wherein the instructions further cause the system to:

obtain contextual state data indicating at least one condition of the speaker, wherein the at least one condition includes one or more of sleep deprivation level, stress level, or intoxication level, and determine the first set of transformations using the contextual state data.

10. The non-transitory computer-readable storage medium of claim 5, wherein the second speech signal is musical content that represents a singing audio output.

11. The non-transitory computer-readable storage medium of claim 5, wherein the instructions further cause the system to:

synchronize the modified acoustic parameter set, subsequent to applying the second set of transformations, across a plurality of computing devices associated with the speaker, wherein each computing device is configured to generate a corresponding speech signal using the modified acoustic parameter set, subsequent to applying the second set of transformations.

12. A computer-implemented method for generating personalized inner voice audio output, the computer-implemented method comprising:

obtaining audio data comprising one or more speech samples;

inputting the audio data into a first artificial intelligence model to generate an acoustic parameter set corresponding to a provisional inner voice model that is configured to synthesize a first speech signal different from the audio data, wherein the first speech signal of the provisional inner voice model shares one or more acoustic characteristics of an external voice of a speaker;

determining a first set of transformations for the acoustic parameter set corresponding to the provisional inner voice model by inputting demographic data associated with the speaker into a second artificial intelligence model to generate the first set of transformations, wherein the second artificial intelligence model is trained on a dataset of acoustic parameters derived from a plurality of users, each associated with (a) corresponding demographic data and (b) one or more corresponding transformations that map a corresponding external voice of the user to a corresponding perceived inner voice of the user;

causing modification of the acoustic parameter set corresponding to the provisional inner voice model by applying the first set of transformations to the acoustic parameter set of the provisional inner voice model;

obtaining user feedback that defines a second set of transformations configured to remove a set of acoustic deviations between (a) a second speech signal generated by the provisional inner voice model using the modified acoustic parameter set and (b) a particular voice of the speaker; and causing application of the second set of transformations to the modified acoustic parameter set of the provisional inner voice model.

13. The computer-implemented method of claim 12, wherein the user feedback is received via a graphical user interface comprising a plurality of adjustable controls, each adjustable control corresponding to a respective acoustic parameter in the acoustic parameter set, and wherein the second set of transformations is generated based on one or more adjustment values received from the plurality of adjustable controls.

14. The computer-implemented method of claim 12, further comprising:

presenting pairs of second speech signals with different acoustic parameter sets, wherein the second set of transformations is generated by bracketing one or more acoustic parameter values based on a user selection of a particular second speech signal within each pair of second speech signals, and wherein the particular second speech signal is configured to align with the particular voice of the speaker to a greater degree than a different second speech signal in the pair of second speech signals.

15. The computer-implemented method of claim 12, wherein the first set of transformations comprises a predefined frequency offset value configured to decrease a frequency parameter of the provisional inner voice model.

16. The computer-implemented method of claim 12, further comprising:

evaluating the audio data to identify one or more positive acoustic characteristics present in the external voice of the speaker and one or more negative acoustic characteristics absent from the external voice of the speaker, wherein the first set of transformations is configured to maintain the one or more positive acoustic characteristics and suppress the one or more negative acoustic characteristics in the second speech signal.

17. The computer-implemented method of claim 12, further comprising:

obtaining a standardized speech sample that represents a recitation of a predetermined phrase by the speaker, comparing one or more acoustic characteristics of the standardized speech sample to a reference database comprising standardized speech samples from a plurality of reference users, identifying a matching reference user using the comparison, determining demographic data associated with the speaker using demographic data associated with the matching reference user; and determining the first set of transformations using corresponding transformations associated with one or more users having at least a portion of common demographic data with the speaker.

18. The computer-implemented method of claim 12, wherein the causing modification of the acoustic parameter set is performed locally on an edge computing device associated with the speaker.

19. The computer-implemented method of claim 12, wherein the causing modification of the acoustic parameter set comprises:

transmitting the audio data to a remote server, performing the modification of the acoustic parameter set on the remote server, and receiving the modified acoustic parameter set from the remote server.

20. The computer-implemented method of claim 12, wherein the determining the first set of transformations comprises:

establishing a communication channel with a plurality of edge computing devices, each edge computing device associated with a respective user and storing a respective acoustic parameter set corresponding to a respective local voice model;

receiving, from each of the plurality of edge computing devices, one or more locally computed set of transformations generated using respective user feedback;

aggregating the locally computed set of transformations from the plurality of edge computing devices to generate a global set of transformations for a global acoustic parameter set for a global provisional voice model, distributing the global set of transformations to the plurality of edge computing devices.

* * * * *